United States Patent [19]

Yotsumoto et al.

[11] Patent Number: 5,075,415

[45] Date of Patent: Dec. 24, 1991

[54] ADHESIVE COMPOSITION FOR FIBROUS MATERIALS BASED ON PHENOL-AMINOPHENOL-FORMALDEHYDE CONDENSATION PRODUCTS

[75] Inventors: Toshihiro Yotsumoto; Koichi Morita; Takeshi Kinoshita, all of Tokyo, Japan

[73] Assignee: Bridgestone Corporation, Tokyo, Japan

[21] Appl. No.: 436,954

[22] Filed: Nov. 15, 1989

Related U.S. Application Data

[62] Division of Ser. No. 213,946, Jul. 1, 1988, abandoned.

[30] Foreign Application Priority Data

| Jul. 6, 1987 | [JP] | Japan | 62-166864 |
| Jul. 6, 1987 | [JP] | Japan | 62-166865 |
| Jul. 6, 1987 | [JP] | Japan | 62-166866 |
| Sep. 21, 1987 | [JP] | Japan | 62-235000 |
| Sep. 21, 1987 | [JP] | Japan | 62-235001 |
| Sep. 21, 1987 | [JP] | Japan | 62-235002 |
| Sep. 21, 1987 | [JP] | Japan | 62-235003 |
| Jun. 10, 1988 | [JP] | Japan | 63-141760 |

[51] Int. Cl.$^5$ .......................... C08L 7/00; C08L 9/00; C08L 11/00; C08L 61/04

[52] U.S. Cl. .................................. 528/149; 525/135; 524/509; 524/510; 524/511; 524/541; 524/595; 524/841

[58] Field of Search .................. 528/149; 525/135; 524/509, 510, 511, 541, 595, 841

[56] References Cited

U.S. PATENT DOCUMENTS

| 2,147,789 | 2/1939 | Graves | 528/149 |
| 2,744,875 | 5/1956 | Thomas et al. | 528/149 |
| 3,366,583 | 1/1968 | Wilson | 528/149 |
| 3,518,159 | 6/1970 | Freeman et al. | 528/149 |
| 3,615,975 | 10/1971 | Gillern et al. | 528/149 |
| 3,704,269 | 11/1972 | Freeman et al. | 528/149 |
| 3,773,721 | 11/1973 | Tiedeman | 528/149 |
| 3,931,110 | 1/1976 | Freeman et al. | 528/149 |
| 4,257,926 | 3/1981 | Tanimura et al. | 525/135 |

Primary Examiner—John Kight, III
Assistant Examiner—Frederick Krass
Attorney, Agent, or Firm—Sughrue, Mion, Zinn, Macpeak & Seas

[57] ABSTRACT

A novel adhesive composition capable of bonding strongly polyester fibers and rubbers with reduced adhesive deterioration even at high temperatures is provided which comprises, as a predominant component, a co-condensation resin obtained by co-condensing at least one member selected from compounds (I) represented by the following general formula,

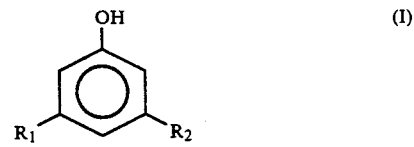

(I)

wherein $R_1$ and $R_2$ are hydrogen atoms, alkyl groups or alkoxy groups, the sum of carbon atoms of $R_1$ and $R_2$ being 0 to 4, at least one member selected from compounds (II) represented by the following general formula,

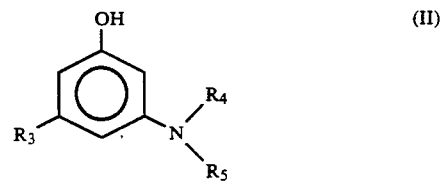

(II)

wherein $R_3$, $R_4$ and $R_5$ are hydrogen atoms or alkyl groups, the sum of carbon atoms of $R_3$, $R_4$ and $R_5$ being 0 to 4, and aldehyde.

9 Claims, 1 Drawing Sheet

ADHESIVE COMPOSITION FOR FIBROUS MATERIALS BASED ON PHENOL-AMINOPHENOL-FORMALDEHYDE CONDENSATION PRODUCTS

This is a division of application Ser. No. 07/213,946, filed 7/1/88, now abandoned.

BACKGROUND OF THE INVENTION

1. Field of the Invention

This invention relates to an adhesive composition for fibrous materials, in particular, polyester fibers and more particularly, it is concerned with a novel adhesive composition capable of bonding strongly polyester fibers and rubbers with reduced adhesive deterioration even at high temperatures.

2. Description of the Prior Art

Polyester materials, linear macromolecules having ester bonds in the main chains typical of polyethylene terephthalate are very useful as reinforcing materials of rubber articles such as tyres, belts, air springs and rubber hoses in the form of filaments, yarns, codes, cables, code textiles and ducks, because of having more stable dynamic properties, lower stress relaxation, lower creep property and better recovery after stretching than other materials such as nylons.

When using polyester fibers as reinforcing materials of these rubber articles, however, bonding between the rubber and reinforcement is hardly obtained with RFL adhesive consisting of a resorcinol/formaldehyde initial condensate and rubber latex capable of well bonding nylons or rayons and rubbers, since the polyester fibers are dense in highly dimensional structure and have few functional groups, and thus the polyester fibers are not suitable for the reinforcing materials of rubber articles. Therefore, a number of adhesive compositions and methods have been proposed, for example, a method comprising treating a polyester surface with an alkali or amine to increase active functional groups on the surface such as —OH, —COOH and —NR$_2$ wherein R is hydrogen or an alkyl group or a method comprising incorporating a compound having groups capable of bonding with hydrogen or making primary bonding by using isocyanate compounds or epoxy compounds onto a polyester surface and then treating with RFL adhesives.

However, the treatment with an alkali or amine has such as disadvantage as deteriorating the tensile strength of polyester fibers, and the isocyanate compounds or epoxy compounds are highly reactive and thus react with water, as a solvent, in RFL and RF in the RFL components, resulting in large difficulty in preparation of a one liquid composition adhesive and in deterioration of the bonding property. In this case, therefore, the process of treating polyester fibers with the adhesives must be carried out separately in two stages, which needs additional installations, steps and heat to that extent, and this is not preferred from the standpoint of saving sources and energy. Furthermore, the isocyanate compounds or epoxy compounds are not preferable in view of bad influences upon the human body due to toxic fume or vapor occurring when treated in the air or when subjected to a heat treatment and in view of the environmental pollution caused thereby.

In performances, polyester fibers or the surfaces thereof tend to be hardned, thus resulting in difficulty of handling, and the most serious disadvantage of polyester fibers is that when using the polyester fibers subjected to the adhesive treatment as described above under a high strain or at a high temperature, there takes place a rapid deterioration of the adhesion and the tensile strength of the fibers, and the life of rubber articles is markedly shortened. The reason therefor is that since an isocyanate compound or epoxy compound is primarily bonded with a polyester fiber on the surface thereof to form a kind of graft polymer (skin-core structure), the polyester molecule chain is decomposed by hydrolysis of the polyester at a high temperature or by aminolysis due to the residual amines of a vulcanization accelerator in a compounded rubber, thus resulting in a bonding breakage on this part in easy manner, and the polyester fiber becomes mechanically brittle under a highly strained state due to a difference in rigidity between the surface and inside of the polyester fiber.

Of late, tyres have been directed to a tendency of light weight from the standpoint of saving energy and it has increasingly been required to improve the stability of a tyre against thermal or mechanical inputs and lengthen the life thereof until breakage. Thus, the bonding force between polyester fibers and rubbers must sufficiently be stable and tenacious against such inputs more than required for the life of a product.

As adhesives for polyester fibers in the form of one liquid composition, there have been proposed a number of adhesive compositions as exemplified by reaction products of resorcinol, p-chlorophenol and formaldehyde (U.S. Pat. No. 3,660,202 and Japanese Patent Publication No. 11,251/1971) and reaction products of resorcinol and triallyl cyanurate. However, these adhesives are not satisfactory, since the bonding force is insufficient and there occurs deterioration of the bonding and the strength of fibers during continuous use at a high temperature and a high strain.

As described above, it is eagerly desired to develop an ideal adhesives for polyester fibers, which can be used in the form of one liquid composition and can realize a tenacious bond to the polyester by one stage processing even at a high temperature, and which can be freed from lowering of the strength of polyester fibers during processing and using, environmental pollution due to occurrence of toxic fume or vapor and deterioration of the bonding during continuous use at a high temperature and strain.

SUMMARY OF THE INVENTION

It is an object of the present invention to provide an adhesive composition for fibrous materials, in particular, polyester fibers, whereby the disadvantages of the prior art, as described above, can be overcome.

It is another object of the present invention to provide a novel adhesive composition for polyester fibers, which is capable of bonding tenaciously polyester fibers and rubbers and being free from deterioration of the bonding even at a high temperature.

These objects can be attained by an adhesive composition for a fibrous material, which comprises, as a predominant component, a co-condensation resin obtained by co-condensing at least one member selected from compounds (I) represented by the following general formula,

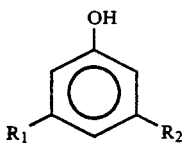

(I)

wherein $R_1$ and $R_2$ are hydrogen atoms, alkyl groups or alkoxy groups, the sum of carbon atoms of $R_1$ and $R_2$ being 0 to 4, at least one member selected from compounds (II) represented by the following general formula,

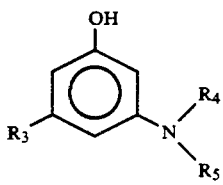

(II)

wherein $R_3$, $R_4$ and $R_5$ are hydrogen atoms or alkyl groups, the sum of carbon atoms of $R_3$, $R_4$ and $R_5$ being 0 to 4 and an aldehyde.

BRIEF DESCRIPTION OF THE DRAWING

The accompanying drawing is to illustrate the principle and merits of the present invention in detail.

DETAILED DESCRIPTION OF THE INVENTION

Figure 1:
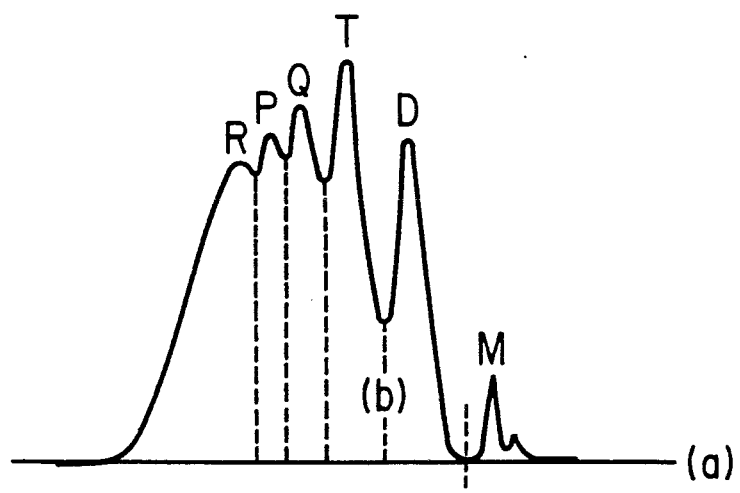
FIG. 1 is a GPC chart of a co-condensation product according to the present invention.

The inventors have made various efforts to develop an adhesive composition capable of satisfying the above described requirements and consequently, have found that co-condensation products obtained by condensing phenol or substituted phenols and aminophenols with aldehydes are largely affective as a component for such an adhesive composition. The present invention is based on this finding.

Accordingly, the present invention provides an adhesive composition for a fibrous material, in particular, polyester fibers, comprising, as a predominant component, a co-condensation resin obtained by condensing at least one member selected from compounds (I) represented by the following general formula,

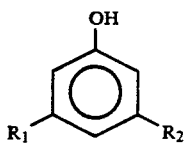

(I)

wherein $R_1$ and $R_2$ have the same meanings as described above, and at least one member selected from compounds (II) represented by the following general formula,

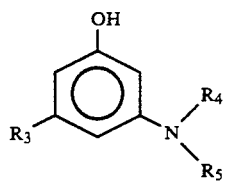

(II)

wherein $R_3$, $R_4$ and $R_5$ have the same meanings as described above, with an aldehyde.

In preferred embodiments of the present invention, Compounds (I) are phenol, m-cresol, m-methoxyphenol and 3,5-xylenol and in other preferred embodiments of the present invention, Compounds (II) are m-aminophenol, N-methyl-m-aminophenol, N,N-dimethyl-m-aminophenol, N-ethyl-aminophenol, 3-amino-5-methylphenol and 3-N-methylamino-5-methylphenol. In particularly preferred embodiments of the present invention, at least one member selected from the group consisting of phenol, m-cresol, m-methoxyphenol and 3,5-xylenol and at least one member selected from the group consisting of m-aminophenol, N-methyl-m-aminophenol, N,N-dimethyl-m-aminophenol, N-ethyl-m-aminophenol, 3-amino-5-methylphenol and 3-N-methylamino-5-methylphenol are used in combination. Above all, as Compound (II) is preferably used m-aminophenol and as the aldehyde is preferably used formaldehyde.

That is, the condensation resin or product of the present invention is obtained by co-condensing phenol or substituted phenols represented by the foregoing general formula (I) (hereinafter referred to as "substituted phenols" as including phenol) and aminophenols represented by the foregoing general formula (II) (hereinafter referred to as "aminophenols") with an aldehyde. For example, the substituted phenols are dissolved or dispersed in water or an organic solvent in a kolben, to which formalin is dropwise added in the presence of a small amount of an alkali, and the resulting mixture is reacted for several hours, mixed with the aminophenols and further reacted for several hours to thus obtain co-condensation resins. When the aminophenols are added, an acidic catalyst such as p-toluenesulfonic acid, oxalic acid, hydrochloric acid or sulfuric acid can be added, followed by reacting for several hours.

The thus resulting co-condensation product is a thermoplastic resin soluble in acetone, alcohol and aqueous alkaline solutions and having a softening point of 80° to 150° C. Measurement of this softening point is generally carried out by using a melting point meter having a brass heating block (Maquenne Block), placing a micro amount of a sample on the heating block, heating the block while observing the sample from above by a microscope and determining a temperature at which the sample is not angular and becomes liquid. The heating should be conducted in such a manner that the temperature can rapidly be raised up to a temperature of (softening point −20° C.), but thereafter it is raised at a rate of 2° C./min.

The kinds of the catalyst, reaction conditions and after-treatments can suitable be chosen so as to give a desired co-condensation composition.

In the present invention, the condensation products of the substituted phenols and aminophenols linked with formaldehyde have preferably a substituted phenol to aminophenol co-condensation mole ratio of 1:0.5 to 1:2 and a mean molecular weight of 400 to 1000. However, the co-condensation product of the present invention is a reaction product of three components, so the weight-average molecular weight thereof is hard to be correctly identified and is defined by GPC (Gel Permeation Chromatography). Preferably, the composition of the co-condensate of the present invention, represented by the number of benzene rings of the aminophenols and substituted phenols linked through methylene chains, comprises, as an optimum range, at most 15% of one substituted phenols structure components, i.e. monomers and 35 to 65% of 5 or more substituted phenols structure components (5 or more nuclei compounds), and comprises more preferably no low molecular components of 2 or less rings and at most 65% of 5 or more substituted phenols structure components.

The co-condensate with a substituted phenols/aminophenols co-condensation mole ratio outside the above described range is not so preferable, since not only the bonding force, in particular, diffusibility thereof to polyester fibers is lowered, but also the reinforcing property for rubber latex, namely the reactivity thereof with a methylene group- or methylene donor-containing resin represented by RF resin as a reinforcing aid of rubber latex is lowered.

The co-condensation ratio of the substituted phenols-/aminophenols can be determined by the following methods:

METHOD (I) (METHOD BY MASS BALANCE DURING SYNTHESIS)

The weight of an initial charge amount minus amounts of fractions in the steps for the synthesis, for example, components not participating in the resin-forming reaction in a step with decrease of weight such as distilling step is sought by the GPC measurement, thus obtaining the co-condensation ratio of the substituted phenols and aminophenols in the finally resulting resin.

METHOD (II) (METHOD FROM SYNTHESIZED RESIN)

The co-condensation ratio of the substituted phenols and aminophenols is calculated by the intensity ratio of phenyl-or $CH_3$-protons in the substituted phenols and $NH_2$-protons in the aminophenols using H-NMR.

Moreover, the above described ratio can also be obtained by quantitatively determining N and O by elementary analysis of the synthesized resin.

Quantitative determination of the nuclei components specified in the present invention is conducted by the following method using a GPC (HLC 802—commercial name—made by Toso Co.):

10 mg of a sample is dissolved in 10 ml of tetrahydrofuran (THF) and moved through columns 1000 HX and 2000 HX—commercial name—in series in the case of co-condensates of phenol or m-cresol, m-aminophenol and formaldehyde or columns G 1000 HXL and G 2000 HXL—commercial name—in series in the case of other co-condensates, using THF as a mobile phase, at an ambient temperature of 40° C. and a flow rate of 1 ml/min, and the eluate is then subjected to measurement of a molecular weight pattern by means of an RI detector. The polymer content is determined by the thus resulting GPC chart as exemplified in FIG. 1 as follows:

(a) The several peaks of the GPC wave form are regarded as monomers M, dimers of substituted phenols structure component D, trimers of substituted phenols structure component T, tetramers of substituted phenols structure component Q, pentamers of substituted phenols structure component P and hexamers of substituted phenols structure component R from the low molecular weight side.

(b) The base of the peak at the low molecular weight side and that of the peak at the high molecular side are connected to give a base line A.

(c) A perpendicular line B is drawn from a valley (bottom) between two peaks of the wave form to the base line to form a boundary of the adjacent nuclei components differing in molecular weight.

(d) The area of the chart showing each substituted phenols structure component is represented by percent to the total area (total area of GPC wave form above base line) to give the content of each of the nuclei components (weight %).

Useful examples of the substituted phenols in the present invention are phenol; alkylphenols such as m-cresol, m-ethylphenol, m-propylphenol, m-t-butylphenol, 3,5-xylenol, 3-methyl-5-ethylphenol, 3-methyl-5-propylphenol and 3-ethyl-5-ethylphenol; alkoxyphenols such as m-methoxyphenol, m-ethoxyphenol, m-propioxyphenol and m-t-butoxyphenol; and 3,5-substituted phenols such as 3-methoxy-5-methylphenol, 3-methoxy-5-ethylphenol, 3-methoxy-5-propylphenol, 3-ethoxy-5-methylphenol, 3-ethoxy-5-ethylphenol, 3-propioxy-5-methylphenol, 3,5-dimethoxyphenol, and 3,5-diethoxyphenol. Above all, phenol, m-cresol, m-methoxyphenol and 3,5-xylenol are preferably used.

On the other hand, useful examples of the aminophenols are m-aminophenol, N-methyl-m-aminophenol, N,N-dimethyl-m-aminophenol, N-ethyl-m-aminophenol, N,N-diethyl-m-aminophenol, 3-amino-5-methylphenol, 3-amino-5-ethylphenol, 3-N-methylamino-5-methylphenol, N,N-dimethyl-3-amino-5-methylphenol and N-methyl-3-amino-5-propylphenol. Above all, m-aminophenol, N-methyl-m-aminophenol, N,N-dimethyl-m-aminophenol, N-ethyl-m-aminophenol, 3-amino-5-methylphenol and N-methyl-3-amino-5-methylphenol are preferably used.

Particularly, a preferable combination of the substituted phenols and aminophenols in the present invention is phenol, m-cresol, m-methoxyphenol or 3,5-xylenol with m-aminophenol.

In the present invention, a co-condensation product is generally synthesized by the following process:

In a kolben reactor equipped with a thermometer, stirrer, refluxing condenser and dropping funnel are charged 1 mol of the substituted phenols, about 100 g of water and an alkaline catalyst in an amount of 0.5% by weight to the substituted phenols and heated at 20° to 100° C., to which a 37% aqueous solution of formalin is added in a proportion of 1 to 2 mols, preferably 1.2 to 1.5 mols to the substituted phenol for 0 to 1 hour. Then, the mixture is subjected to a first stage reaction for forming resol at the above described temperature for 0.5 to 8 hours.

To this first stage reaction mixture are added the aminophenols in a proportion of 0.5 to 3.0 mols to 1 mol of the substituted phenols and heated with agitation at a temperature of 70° to 130° C. for 10 minutes to 4 hours. Further, the mixture is heated at 130° to 220° C. under a reduced pressure of 40 torr or lower and water is thus distilled off for 30 minutes to 4 hours to complete a second stage reaction, thus obtaining an aimed co-condensation product.

Since the unreacted monomers affect unfavorably the adhesiveness of the product, an after-treatment should be carried out when the content thereof in the co-condensation product exceeds 15%. For this after-treatment, there can be employed any of methods comprising distilling the reaction mixture at a temperature of 180° to 220° C. under a reduced pressure of 5 torr or lower for 20 minutes to 1 hour, and comprising extracting the monomers with an organic solvent such as aliphatic ketones, ethers or toluene.

NECESSITY OF TWO STAGE REACTION

The reason therefor is that if formalin is added to mixtures of the substituted phenols and aminophenols and reacted, a gel of the aminophenols is formed and the aimed co-condensation products cannot be obtained.

REACTION SOLVENT

Organic solvents such as alcohols, ethers and THF, and water can be used. Above all, water is preferably used. These solvents are generally used in an amount of 0 to 4 times by weight as much as that of the substituted phenols, but too excessive amounts of the solvents should be avoided because of troublesomeness in removal thereof.

FIRST STAGE REACTION

As the reaction catalyst, there can be used alkaline materials, for example, metal hydroxides such as NaOH and organic amines. $Ca(OH)_2$ is preferably used. These alkaline materials are generally used in a proportion of 0.01 to 3.0 % by weight, preferably 0.5% by weight to the substituted phenols, since if less than 0.01% by weight, the reaction is too slow, while if more than 3% by weight, it is too rapid or the remained alkali affects unfavorably the adhesiveness.

The amount of formalin to be added is generally 1 to 2 times by mole preferably 1.2 to 1.5 times by mole as much as that of the substituted phenols, since if less than the lower limit, the substituted phenols monomers remain to lower the yield, while if more than the upper limit, the substituted phenols are of a largely high molecular weight and sometimes become gelled, which should be avoided.

The first stage reaction is generally carried out at a reaction temperature of 20° to 100° C., since if the reaction temperature is lower than 20° C., resol formation does not proceed, while if higher than 100° C., only the substituted phenols become a high molecular weight material being not favorable. Furthermore, the first stage reaction is generally carried out for 0.5 to 8 hours, since if less than 0.5 hour, resol formation does not proceed, while if more than 8 hours, the substituted phenols become a high molecular weight material.

Apparently, the reaction temperatures, reaction times and other reaction conditions of the above described first stage reaction and hereinafter described second stage reaction can more suitably be chosen depending upon the kinds of the substituted phenols and aminophenols, individually or in combination.

SECOND STAGE REACTION

Addition of the aminophenols in powdered form can be carried out as these are powdered or after dissolving in water or organic solvents such as alcohols and ethers. This reaction can be carried out in the presence of organic acids such as oxalic acid and p-toluene-sulfonic acid or inorganic acids such as hydrochloric acid and sulfuric acid.

The amount of the aminophenols to the substituted phenols is generally 0.5 to 3.0 mols to 1 mol of the substituted phenols, since if the amount is less than 0.5 mol, the co-condensation product is of a high molecular weight, while if more than 3 mols, it is of a low molecular weight, that is, contains a large amount of the monomers not favorable.

The reaction temperature of the second stage is preferably 70° to 130° C., the upper limit of which is limited by the boiling point of a reaction solvent. The reaction time of the second stage is preferably 10 minutes to 4 hours, since if longer than 4 hours, the co-condensate is of a high molecular weight, which is not favorable.

The distillation is preferably carried out at a temperature of 130° to 220° C. while gradually raising the degree of vacuum so that the co-condensation product be not solidified. A temperature of higher than 220° C. is not preferable, since thermal decomposition or oxidation decomposition of the co-condensation product probably occurs at that temperature.

In a first embodiment of the present invention, a co-condensation product can be synthesized as follows:

In a kolben reactor equipped with a thermometer, stirrer, refluxing condenser and dropping funnel are charged 1 mol of phenol, about 100 g of water and an alkaline catalyst in an amount of 0.5% by weight to the phenol and heated at 60° to 100° C., preferably 80° C., to which a 37% aqueous solution of formalin is added in a proportion of 1 to 2 mols, preferably 1.2 to 1.5 mols to the phenol for 0 to 1 hour. Then, the mixture is subjected to a first stage reaction for forming resol at the above described temperature for 1 to 8 hours.

To this first stage reaction mixture is added m-aminophenol in a proportion of 0.5 to 3.0 mols to 1 mol of the phenol and heated with agitation at a temperature of 70° to 130° C. for 10 minutes to 4 hours. Further, the mixture is heated at 130° to 220° C. under a reduced pressure of 40 torr or lower and water is thus distilled off for 30 minutes to 4 hours to complete a second stage reaction, thus obtaining an aimed co-condensation product.

Since the unreacted monomers affect unfavorably the adhesiveness of the product, an after-treatment should be carried out when the content thereof in the co-condensation product exceeds 15%. For this after-treatment, there can be employed any of methods comprising distilling the reaction mixture at a temperature of 180° to 220° C. under a reduced pressure of 5 torr or lower for 20 minutes to 1 hour, and comprising extracting the monomers with an organic solvent such as aliphatic ketones, ethers or toluene.

The first stage reaction is generally carried out at a reaction temperature of 60° to 100° C., preferably 70° to 90° C., since if the reaction temperature is lower than 60° C., resol formation does not proceed, while if higher than 100° C., only the phenol becomes a high molecular weight material being not favorable.

The first stage reaction is generally carried out for 1 to 8 hours, since if less than 1 hour, resol formation does not proceed, while if more than 8 hours, the phenol becomes a high molecular weight material.

The second stage reaction is generally carried out at a reaction temperature of 70° to 130° C., the upper limit of which is limited by the boiling point of a reaction solvent. Furthermore, the second stage reaction is preferably carried out for 10 minutes to 4 hours, since if longer than 4 hours, the co-condensate is of a high molecular weight, which is not favorable.

In a second embodiment of the present invention, a co-condensation product can be synthesized as follows:

In a kolben reactor equipped with a thermometer, stirrer, refluxing condenser and dropping funnel are charged 1 mol of phenol, about 100 g of water and an alkaline catalyst in an amount of 0.5% by weight to the phenol and heated at 60° to 100° C., to which a 37% aqueous solution of formalin is added in a proportion of 1 to 2 mols, preferably 1.2 to 1.5 mols to the phenol for 0 to 20 minutes. Then, the mixture is subjected to a first stage reaction for forming resol at the above described temperature for 0.5 to 8 hours.

To this first stage reaction mixture is added the substituted m-aminophenols in a proportion of 0.5 to 3 mols to 1 mol of the phenol and heated with agitation at a temperature of 70° to 130° C. for 1 to 4 hours. Further, the mixture is heated at 130° to 220° C. under a reduced pressure of 40 torr or lower and water is thus distilled off for 30 minutes to 1 hour to complete a second stage reaction, thus obtaining an aimed co-condensation product.

Since the unreacted monomers affect unfavorably the adhesiveness of the product, an after-treatment should be carried out when the content thereof in the co-condensation product exceeds 15%. For this after-treatment, there can be employed any of methods comprising distilling the reaction mixture at a temperature of 180° to 220° C. under a reduced pressure of 5 torr or lower for 20 minutes to 1 hour, and comprising extracting the monomers with an organic solvent such as aliphatic ketones, ethers or toluene.

The first stage reaction is generally carried out at a reaction temperature of 60° to 100° C., preferably 70° to 90° C., since if the reaction temperature is lower than 60° C., resol formation does not proceed, while if higher than 100° C., only the phenol becomes a high molecular weight material being not favorable.

The first stage reaction is generally carried out for 1 to 8 hours, since if less than 1 hour, resol formation does not proceed, while if more than 8 hours, the phenol becomes a high molecular weight material.

The second stage reaction is generally carried out at a reaction temperature of 70° to 130° C., the upper limit of which is limited by the boiling point of a reaction solvent. Furthermore, the second stage reaction is preferably carried out for 1 to 4 hours, since if longer than 4 hours, the co-condensate is of a high molecular weight, which is not favorable.

In a third embodiment of the present invention, a co-condensation product can be synthesized as follows:

In a kolben reactor equipped with a thermometer, stirrer, refluxing condenser and dropping funnel are charged 1 mol of m-cresol, about 100 g of water and an alkaline catalyst in an amount of 0.5% by weight to the cresol and heated at 50° to 90° C., preferably 60° C., to which a 37% aqueous solution of formalin is added in a proportion of 1 to 2 mols, preferably 1.2 to 1.5 mols to the cresol for 0 to 1 hour. Then, the mixture is subjected to a first stage reaction for forming resol at the above described temperature for 1 to 8 hours.

To this first stage reaction mixture is added m-aminophenol in a proportion of 0.5 to 2.5 mols to 1 mol of the m-cresol and heated with agitation at a temperature of 70° to 130° C. for 30 minutes to 4 hours. Further, the mixture is heated at 130° to 220° C. under a reduced pressure of 40 torr or lower and water is thus distilled off for 30 minutes to 4 hours to complete a second stage reaction, thus obtaining an aimed co-condensation product.

Since the unreacted monomers affect unfavorably the adhesiveness of the product, an after-treatment should be carried out when the content thereof in the co-condensation product exceeds 15%. For this after-treatment, there can be employed any of methods comprising distilling the reaction mixture at a temperature of 180° to 220° C. under a reduced pressure of 5 torr or lower for 20 minutes to 1 hour, and comprising extracting the monomers with an organic solvent such as aliphatic ketones, ethers or toluene.

The first stage reaction is generally carried out at a reaction temperature of 50° to 90° C., preferably 50° to 70° C., since if the reaction temperature is lower than 50° C., resol formation does not proceed, while if higher than 90° C., only the m-cresol becomes a high molecular weight material being not favorable.

The first stage reaction is generally carried out for 1 to 8 hours, since if less than 1 hour, resol formation does not proceed, while if more than 8 hours, the m-cresol becomes a high molecular weight material.

The second stage reaction is generally carried out at a reaction temperature of 70° to 130° C., the upper limit of which is limited by the boiling point of a reaction solvent. Furthermore, the second stage reaction is preferably carried out for 30 minutes to 4 hours, since if longer than 4 hours, the co-condensate is of a high molecular weight, which is not favorable.

In a fourth embodiment of the present invention, a co-condensation product can be synthesized as follows:

In a kolben reactor equipped with a thermometer, stirrer, refluxing condenser and dropping funnel are charged 1 mol of m-cresol, about 100 g of water and an alkaline catalyst in an amount of 0.5% by weight to the m-cresol and heated at 50° to 90° C., preferably 60° C., to which a 37% aqueous solution of formalin is added in a proportion of 1 to 2 mols, preferably 1.2 to 1.5 mols to the m-cresol for 0 to 20 minutes. Then, the mixture is subjected to a first stage reaction for forming resol at the above described temperature for 1 to 6 hours.

To this first stage reaction mixture is added the substituted m-aminophenols in a proportion of 0.5 to 3.0 mols to 1 mol of the m-cresol and heated with agitation at a temperature of 70° to 130° C. for 1 to 4 hours. Further, the mixture is heated at 130° to 220° C. under a reduced pressure of 40 torr or lower and water is thus distilled off for 30 minutes to 1 hour to complete a second stage reaction, thus obtaining an aimed co-condensation product.

Since the unreacted monomers affect unfavorably the adhesiveness of the product, an after-treatment should be carried out when the content thereof in the co-condensation product exceeds 15%. For this after-treatment, there can be employed any of methods comprising distilling the reaction mixture at a temperature of 180° to 220° C. under a reduced pressure of 5 torr or lower for 20 minutes to 1 hour, and comprising extracting the monomers with an organic solvent such as aliphatic ketones, ethers or toluene.

The first stage reaction is generally carried out at a reaction temperature of 50° to 90° C., preferably 50° to 70° C., since if the reaction temperature is lower than 50° C., resol formation does not proceed, while if higher than 90° C., only the m-cresol becomes a high molecular weight material being not favorable.

The first stage reaction is generally carried out for 1 to 6 hours, since if less than 1 hour, resol formation does not proceed, while if more than 6 hours, the m-cresol becomes a high molecular weight material.

The second stage reaction is generally carried out at a reaction temperature of 70° to 130° C., the upper limit of which is limited by the boiling point of a reaction solvent. Furthermore, the second stage reaction is preferably carried out for 1 to 4 hours, since if longer than 4 hours, the co-condensate is of a high molecular weight, which is not favorable.

In a fifth embodiment of the present invention, a co-condensation product can be synthesized as follows:

In a kolben reactor equipped with a thermometer, stirrer, refluxing condenser and dropping funnel are charged 1 mol of m-methoxyphenol, about 100 g of water and an alkaline catalyst in an amount of 0.5% by weight to the m-methoxyphenol and heated at 40° to 80° C., preferably 60° C., to which a 37% aqueous solution of formalin is added in a proportion of 1 to 2 mols, preferably 1.2 to 1.5 mols to the m-methoxyphenol for 0 to 20 minutes. Then, the mixture is subjected to a first stage reaction for forming resol at the above described temperature for 0.5 to 3 hours.

To this first stage reaction mixture is added m-aminophenol in a proportion of 0.5 to 3.0 mols to 1 mol of the m-methoxyphenol and heated with agitation at a temperature of 70° to 130° C. for 1 to 4 hours. Further, the mixture is heated at 130° to 220° C. under a reduced pressure of 40 torr or lower and water is thus distilled off for 30 minutes to 1 hour to complete a second stage reaction, thus obtaining an aimed co-condensation product.

Since the unreacted monomers affect unfavorably the adhesiveness of the product, an after-treatment should be carried out when the content thereof in the co-condensation product exceeds 15%. For this after-treatment, there can be employed any of methods comprising distilling the reaction mixture at a temperature of 180° to 220° C. under a reduced pressure of 5 torr or lower for 20 minutes to 1 hour, and comprising extracting the monomers with an organic solvent such as aliphatic ketones, ethers or toluene.

The first stage reaction is generally carried out at a reaction temperature of 40° to 80° C., preferably 40° to 70° C., since if the reaction temperature is lower than 40° C., resol formation does not proceed, while if higher than 80° C., only the m-methoxyphenol becomes a high molecular weight material being not favorable.

The first stage reaction is generally carried out for 0.5 to 3 hours, since if less than 0.5 hour, resol formation does not proceed, while if more than 3 hours, the m-methoxyphenol becomes a high molecular weight material.

The second stage reaction is generally carried out at a reaction temperature of 70° to 130° C., the upper limit of which is limited by the boiling point of a reaction solvent. Furthermore, the second stage reaction is preferably carried out for 1 to 4 hours, since if longer than 4 hours, the co-condensate is of a high molecular weight, which is not favorable.

In a sixth embodiment of the present invention, a co-condensation product can be synthesized as follows:

In a kolben reactor equipped with a thermometer, stirrer, refluxing condenser and dropping funnel are charged 1 mol of m-methoxyphenol, about 100 g of water and an alkaline catalyst in an amount of 0.5% by weight to the m-methoxyphenol and heated at 40° to 80° C., preferably 60° C., to which a 37% aqueous solution of formalin is added in a proportion of 1 to 2 mols, preferably 1.2 to 1.5 mols to the m-methoxyphenol for 0 to 20 minutes. Then, the mixture is subjected to a first stage reaction for forming resol at the above described temperature for 0.5 to 3 hours.

To this first stage reaction mixture is added the substituted m-aminophenol in a proportion of 0.5 to 3.0 mols to 1 mol of the m-methoxyphenol and heated with agitation at a temperature of 70° to 130° C. for 1 to 4 hours. Further, the mixture is heated at 130° to 220° C. under a reduced pressure of 40 torr or lower and water is thus distilled off for 30 minutes to 1 hour to complete a second stage reaction, thus obtaining an aimed co-condensation product.

Since the unreacted monomers affect unfavorably the adhesiveness of the product, an after-treatment should be carried out when the content thereof in the co-condensation product exceeds 15%. For this after-treatment, there can be employed any of methods comprising distilling the reaction mixture at a temperature of 180° to 220° C. under a reduced pressure of 5 torr or lower for 20 minutes to 1 hour, and comprising extracting the monomers with an organic solvent such as aliphatic ketones, ethers or toluene.

The first stage reaction is generally carried out at a reaction temperature of 40° to 80° C., preferably 40° to 70° C., since if the reaction temperature is lower than 40° C., resol formation does not proceed, while if higher than 80° C., only the m-methoxyphenol becomes a high molecular weight material being not favorable.

The first stage reaction is generally carried out for 0.5 to 3 hours, since if less than 0.5 hour, resol formation does not proceed, while if more than 3 hours, the phenol becomes a high molecular weight material.

The second stage reaction is generally carried out at a reaction temperature of 70° to 130° C., the upper limit of which is limited by the boiling point of a reaction solvent. Furthermore, the second stage reaction is preferably carried out for 1 to 4 hours, since if longer than 4 hours, the co-condensate is of a high molecular weight, which is not favorable.

In a seventh embodiment of the present invention, a co-condensation product can be synthesized as follows:

In a kolben reactor equipped with a thermometer, stirrer, refluxing condenser and dropping funnel are charged 1 mol of the substituted phenols, about 100 g of water and an alkaline catalyst in an amount of 0.5% by weight to the substituted phenols and heated at 20° to 80° C., to which a 37% aqueous solution of formalin is added in a proportion of 1 to 2 mols, preferably 1.2 to 1.5 mols to the substituted phenols for 0 to 20 minutes. Then, the mixture is subjected to a first stage reaction for forming resol at the above described temperature for 0.5 to 6 hours.

To this first stage reaction mixture is added the aminophenols in a proportion of 0.5 to 3.0 mols to 1 mol of the substituted phenols and heated with agitation at a temperature of 70° to 130° C. for 1 to 4 hours. Further, the mixture is heated at 130° to 220° C. under a reduced pressure of 40 torr or lower and water is thus distilled off for 30 minutes to 1 hour to complete a second stage reaction, thus obtaining an aimed co-condensation product.

Since the unreacted monomers affect unfavorably the adhesiveness of the product, an after-treatment should be carried out when the content thereof in the co-condensation product exceeds 15%. For this after-treatment, there can be employed any of methods comprising distilling the reaction mixture at a temperature of 180° to 220° C. under a reduced pressure of 5 torr or lower for 20 minutes to 1 hour, and comprising extracting the monomers with an organic solvent such as aliphatic ketones, ethers or toluene.

The first stage reaction is generally carried out at a reaction temperature of 20° to 80° C., preferably 40° to 70° C., since if the reaction temperature is lower than 20° C., resol formation does not proceed, while if higher than 80° C., only the substituted phenols becomes a high molecular weight material being not favorable.

The first stage reaction is generally carried out for 0.5 to 6 hours, since if less than 0.5 hour, resol formation does not proceed, while if more than 6 hours, the substituted phenols becomes a high molecular weight material.

The second stage reaction is generally carried out at a reaction temperature of 70° to 130° C., the upper limit of which is limited by the boiling point of a reaction solvent. Furthermore, the second stage reaction is preferably carried out for 1 to 4 hours, since if longer than 4 hours, the co-condensate is of a high molecular weight, which is not favorable.

The co-condensation product in the present invention can be used jointly with rubber latexes containing methylene donors or methylene donor-containing resins, for example, resorcinol-formaldehyde (RF) resins of resol type. As the methylene donor, there can preferably be used formalin, paraformaldehyde, hexamethylenetetramine, etc.

In the case of mixing with rubber latexes, the co-condensation product is preferably diluted with a solvent such as aqueous alkaline solutions and sometimes is dissolved in an organic solvent such as alcohol and acetone. Examples of the aqueous alkaline solution are solutions of sodium hydroxide, potassium hydroxide, lithium hydroxide, ammonium hydroxide and organic amines such as monomethylamine. As occasion demands, it can be dispersed in solvents with suitable anionic surfactants using dispersing devices such as ball mills and sand mills. In this case, the amount of a surfactant should be as small as possible to such an extent that the dispersibility is not deteriorated for the purpose of effectively realizing the adhesiveness.

The co-condensation product in the form of an aqueous or organic solution or dispersion, as described above, is mixed with a rubber latex or RFL to prepare an adhesive composition. The mixing ratio of the co-condensation product to a rubber latex or RFL is preferably 10:100 to 125:100 by solid content, since if the ratio is smaller than 10:100, the adhesiveness thereof to polyester fibers is remarkably lowered, while if larger than 125:100, the adhesiveness to compounded rubbers is largely deteriorated.

The mixing ratio of a methylene donors or methylene donor-containing resin such as RF resins to the co-condensation product is preferably 0.04:1 to 2.5:1, since if the ratio is smaller than 0.04:1, the co-condensation product exhibits a lower network forming capacity and the adhesive composition is too soft, while if larger than 2.5:1, resinification of the co-condensation product so much proceeds that the adhesive composition is too brittle.

As the RF resin, one of the methylene donor-containing resins, there is preferably used one prepared by reacting resorcinol and formaldehyde in a resorcinol to formaldehyde ratio of 1:1 to 1:2 by solid content in the presence of an alkaline catalyst such as sodium hydroxide, potassium hydroxide, ammonium hydroxide, organic amines and urea. Melamine, urea, thiourea, phenol, etc. can be used instead of the resorcinol.

Examples of the rubber latex used in the present invention are natural rubber latex, VP latex, SBR latex, butyl latex, NBR latex, CR latex and compound rubbers dispersed in water or organic solvents. These rubber latexes are suitably chosen depending on uses of the adhesive composition and can be used individually or in combination.

The thus obtained liquid adhesive composition (hereinafter referred to as "adhesive liquid") is allowed to adhere to fibrous materials, for example, polyester fibers and subjected to a heat treatment to prepare adhesive-treated polyester fibers, which can be buried in a non-vulcanized compound rubber, vulcanized and thus strongly bonded thereto.

Coating of fibrous materials with the adhesive liquid can be conducted by any of methods comprising immersing the fibrous materials in the adhesive liquid, applying the adhesive liquid using a brush and spraying the adhesive liquid onto the fibrous materials, depending on the situation. The heat treatment is generally carried out at a temperature of at least Tg of the fibrous material polymer, preferably higher than (melting temperature—70° C.) but lower than (melting temperature—20° C.), since if lower than Tg, the molecular mobility of the fibrous material polymer is low and the diffusibility of the co-condensate of the present invention is thus limited into the fibrous material polymer, thereby rendering the co-condensate hardly adhesive, while if higher than the temperature of (melting temperature—20° C.), polyester fibers deteriorate to result in lowering of its strength. On the other hand, when the fibrous material has a melting temperature of exceeding 270° C. or has no melting temperature, the heat treatment should be carried out at a temperature of lower than 250° C., since at a temperature of higher than 250° C. a partial decomposition of the co-condensate is broken out.

Before this heat treatment, a drying treatment at a temperature of 100° to 200° C. can be carried out so as to evaporate the solvent, as usual.

The polyester fiber used in the present invention is a linear high molecular weight material having ester bonds, more specifically in a proportion of at least 25% in the main chain, which can be prepared from glycols and dicarboxylic acids.

The glycols include ethylene glycol, propylene glycol, butylene glycol, methoxypolyethylene glycol, pentaerythritol, etc. On the other hand, the dicarboxylic acids include terephthalic acid, isophthalic acid, derivatives thereof obtained by condensation through esterification or ester exchange reaction, such as dimethyl esters, etc. The most typical fibers are polyethylene terephthalate fibers.

These polyester fibers can be used in any form of codes, cables, filaments, filament chips, code textiles and ducks and if necessary, can be subjected to pretreatments such as by electron beam, microwave, corona discharge and plasma. The present invention can be favorably applied to any polyester fibers.

The adhesive composition of the present invention can be applied to all fibrous materials suitable for use in reinforcing rubber articles, for example, aliphatic polyamide fibers typical of which are rayons, vinylon, 6-nylon, 66-nylon and 46-nylon, aromatic polyamide fibers typical of which is p-phenylene terephthalamide and inorganic fibers typical of which are carbon fibers and glass fibers in addition to the polyester fibers as described above. Moreover, the adhesive composition of the present invention can be applied to processing of fibers such as polyester fibers, aromatic polyamide fibers and carbon fibers treated with epoxy compounds or isocyanate compounds in each step of polymerization, spinning and after-treatment, or fibers subjected previously to pretreatments such as by electron beam, microwave and plasma. These fibrous materials can be in any form of codes, cables, filaments, filament chips, code textiles and ducks.

Processing with the adhesive composition of the present invention can favorably applied to all rubber articles such as tyres, belt, conveyor belts, hoses, air springs and the like. Application or coating of the adhesive composition can be carried out by any methods, for example, by immersing fibers in the adhesive liquid, by coating by a doctor knife or brush, by spraying onto fibers and by blowing the adhesive composition in powdered form against fibers.

When fibers cannot directly be treated with the co-condensation product of the present invention, it can be added to materials to be reinforced by the fibers, for example, a non-vulcanized compound rubber.

ADVANTAGES OF THE PRESENT INVENTION

The condensation products of the substituted phenols, aminophenols and formaldehyde according to the present invention exhibits a higher adhesiveness to fibrous materials, in particular, polyester fibers and rubbers, because the co-condensation products have such a high solubility and diffusibility in polyester fibers that these are diffused in the polyester surfaces in large amounts and bonded therewith, and all of the monomers composing the co-condensation product are tri-functional to methylol-forming reaction and methylene-bridging and thus highly reactive with RF resins and methylene donors, resulting in an effective resinification. Accordingly, the adhesive composition of the present invention has a higher bonding force even at a high temperature and is free from deterioration of the adhesiveness during continuous use at a high temperature and high strain and deterioration of the tensile strength of fibrous materials, and from environmental pollution because of much less toxicity.

The present invention will be explained in detail with reference to the following examples. It will be obvious to those skilled in the art that various changes and modifications can be made in components, ratios, operational order and the like without departing from the spirit of the present invention. Therefore, the present invention should not be construed as being limited to the following examples. All ratios, parts and percents used herein are to be taken as those by weight unless otherwise indicated.

EXAMPLE 1

94 parts (1 mol) of phenol, 100 parts of water and 0.47 part of calcium hydroxide were charged in a kolben reactor equipped with a thermometer, stirrer, reflux condenser and dropping funnel, to which 114 parts (1.4 mols) of a 37% aqueous solution of formalin was dropwise added for 0.5 hour while stirring at 70° C., and the mixture was further stirred at the same temperature for 5 hours.

218 parts (2 mols) of m-aminophenol was added to the mixture, stirred at a temperature of 120° C. for 1 hour, then heated at a temperature of 150° C. under a reduced pressure of 40 torr for 1 hour to distil off water and further heated at a temperature of 200° C. for 0.5 hour under a reduced pressure of 5 torr to reduce the unreacted monomers, thus obtaining a co-condensation resin of phenol.m-aminophenol.formaldehyde.

The resulting resin had a composition comprising 9.0% of the monomers and 48.0% of 5 or more substituted phenols structure components, the phenol/m-aminophenol co-condensation mol ratio being 1.4, and a softening point of 112° C.

20 parts of the above described co-condensation product was taken as solid and dissolved in an aqueous alkaline solution of 1.2 parts of sodium hydroxide dissolved in 78.8 parts of water. To 23.1 parts of this solution was added 76.9 parts of RFL having the following composition as shown in Table 1, the components being mixed and allowed to stand for ageing at 25° C. for 4 hours:

TABLE 1

|  | Parts |
|---|---|
| Water | 520.6 |
| Resorcinol | 14.5 |
| Formalin (37%) | 18.5 |
| Sodium Hydroxide (10%) | 10.5 |
| Vinylpyridine-Styrene-Butadiene Copolymer Latex | 324.9 |
| Styrene-Butadiene Copolymer Latex | 111.0 |

A polyethylene terephthalate tyre code with number of twists of 1500 d/2, second twist of 40 times/10 cm and first twist of 40 times/10 cm was immersed in the above described adhesive composition liquid, dried at 150° C. for 1.5 minutes and then subjected to a heat treatment in an atmosphere maintained at 240° C. for 2 minutes.

The thus treated tyre code was then estimated as to the initial bonding force, and theat resisting bonding force using a compound rubber composition as shown in Table 2:

TABLE 2

|  | Parts |
|---|---|
| Natural Rubber | 80 |
| Styrene-Butadiene Copolymer Rubber | 20 |
| Carbon Black | 40 |
| Stearic Acid | 2 |
| Petroleum Type Softening Agent | 10 |
| Pine Tar | 4 |
| Zinc White | 5 |
| N-Phenyl-B-Naphthylamine | 1.5 |
| 2-Benzothiazyl Disulfide | 0.75 |
| Diphenylguanidine | 0.75 |
| Sulfur | 2.5 |

Initial Bonding Force

The adhesive-treated code was buried in the non-vulcanized compound rubber composition shown in Table 2 and vulcanized at 145° C. and 20 kg/cm² for 30 minutes. The code was dug out of the resulting vulcanized rubber and stripped therefrom at a rate of 30 cm/min, during which the resistance value was measured to obtain the initial bonding force. The results are shown in Table 3.

Heat Resisting Bonding Force

A vulcanized rubber was prepared in the similar manner to that prepared in the measurement of the initial bonding force, enclosed in a glass tube rinsed with nitrogen, allowed to stand in a hot oven at 125° C. for 5 days and then subjected to measurement of the stripping resistance value in the similar manner to that of the initial bonding force to obtain the heat resisting bonding force. The results are shown in Table 3.

EXAMPLE 2

94 parts (1 mol) of phenol, 100 parts of water and 0.47 part of calcium hydroxide were charged in a kolben reactor equipped with a thermometer, stirrer, reflux condenser and dropping funnel, to which 130 parts (1.6 mols) of 37% formalin was dropwise added for 0.5 hour while stirring at 70° C., and the mixture was further stirred at the same temperature for 5 hours. 306 parts (2.8 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of phenol.m-aminophenol.formaldehyde.

The resulting resin had a composition comprising 8.0% of the monomers and 47.0% of 5 or more substituted phenols structure component, a phenol/m-aminophenol co-condensation mol ratio of 1/2.1 and a softening point of 121° C.

Estimation of the resin was carried out in an analogous manner to Example 1 to obtain results as shown in Table 3.

EXAMPLE 3

94 parts (1 mol) of phenol, 100 parts of water and 0.47 part of calcium hydroxide were charged in a kolben reactor equipped with a thermometer, stirrer, reflux condenser and dropping funnel, to which 89 parts (1.1 mols) of 37% formalin was dropwise added for 0.5 hour while stirring at 80° C., and the mixture was further stirred at the same temperature for 7 hours. 153 parts (1.4 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of phenol.m-aminophenol.formaldehyde.

The resulting resin had a composition comprising 9.0% of the monomers and 44.0% of 5 or more substituted phenols structure component, a phenol/m-aminophenol co-condensation mol ratio of 1/1.1 and a softening point of 112° C.

Estimation of the resin was carried out in an analogous manner to Example 1 to obtain results as shown in Table 3.

EXAMPLE 4

94 parts (1 mol) of phenol, 100 parts of water and 0.47 part of calcium hydroxide were charged in a kolben reactor equipped with a thermometer, stirrer, reflux condenser and dropping funnel, to which 89 parts (1.1 mols) of 37% formalin was dropwise added for 0.5 hour while stirring at 90° C., and the mixture was further stirred at the same temperature for 7 hours. 109 parts (1 mol) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of phenol.m-aminophenol.formaldehyde.

The resulting resin had a composition comprising 13.0% of the monomers and 35.0% of 5 or more substituted phenols structure component, a phenol/m-aminophenol co-condensation mol ratio of 1/0.5 and a softening point of 90° C.

Estimation of the resin was carried out in an analogous manner to Example 1 to obtain results as shown in Table 3.

EXAMPLE 5

94 parts (1 mol) of phenol, 100 parts of water and 0.47 part of calcium hydroxide were charged in a kolben reactor equipped with a thermometer, stirrer, reflux condenser and dropping funnel, to which 97 parts (1.2 mols) of 37% formalin was dropwise added for 10 minutes, while stirring at 70° C., and the mixture was further stirred at the same temperature for 3 hours. 218 parts (2 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of phenol.m-aminophenol.formaldehyde.

The resulting resin had a composition comprising 14.0% of the monomers and 33.0% of 5 or more substituted phenols structure component, a phenol/m-aminophenol co-condensation mol ratio of 1/1.4 and a softening point of 99° C.

Estimation of the resin was carried out in an analogous manner to Example 1 to obtain results as shown in Table 3.

EXAMPLE 6

94 parts (1 mol) of phenol, 100 parts of water and 0.47 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 70° C., and the mixture was further stirred at the same temperature for 5 hours. 218 parts (2 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of phenol.m-aminophenol.formaldehyde.

The resulting resin had a composition comprising 7.0% of the monomers and 55.0% of 5 or more substituted phenols structure component, a phenol/m-aminophenol co-condensation mol ratio of 1/1.4 and a softening point of 117° C.

Estimation of the resin was carried out in an analogous manner to Example 1 to obtain results as shown in Table 3.

EXAMPLE 7

94 parts (1 mol) of phenol, 100 parts of water and 0.47 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 70° C., and the mixture was further stirred at the same temperature for 5 hours. 44 parts (0.4 mol) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of phenol.m-aminophenol.formaldehyde.

The resulting resin had a composition comprising 10.0% of the monomers and 45.0% of 5 or more substituted phenols structure component, a phenol/m-aminophenol co-condensation mol ratio of 1/0.2 and a softening point of 85° C.

Estimation of the resin was carried out in an analogous manner to Example 1 to obtain results as shown in Table 3.

EXAMPLE 8

94 parts (1 mol) of phenol, 100 parts of water and 0.47 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 70° C., and the mixture was further stirred at the same temperature for 5 hours. 349 parts (3.2 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of phenol.m-aminophenol.formaldehyde.

The resulting resin had a composition comprising 9.0% of the monomers and 46.0% of 5 or more substituted phenols structure component, a phenol/m-aminophenol co-condensation mol ratio of 1/2.4 and a softening point of 132° C.

Estimation of the resin was carried out in an analogous manner to Example 1 to obtain results as shown in Table 3.

EXAMPLES 9 TO 12

The procedure of Example 1 was repeated except changing the mixing ratio of the aqueous alkaline solution of the co-condensation product and RFL, thus obtaining test results as shown in Table 3.

EXAMPLE 13

The procedure of Example 1 was repeated except using a rubber latex having the following composition and the resulting estimation results are shown in Table 3:

| Rubber Latex | Parts |
|---|---|
| Water | 506.4 |
| Formalin (37%) | 4.1 |
| Sodium Hydroxide (10% aqueous solution) | 3.1 |
| Vinylpyridine-Styrene-Butadiene Copolymer Rubber Latex (41%) | 362.5 |
| Styrene-Butadiene Copolymer Rubber Latex (40%) | 123.9 |

COMPARATIVE EXAMPLE 1

109 parts (1 mol) of m-aminophenol, 110 parts of methanol and 0.6 part of calcium hydroxide were charged in a kolben reactor equipped with a thermometer, stirrer, reflux condenser and dropping funnel, to which 105 parts (1.3 mols) of 37% formalin was dropwise added for 0.5 hour at a temperature of 120° C., and the mixture was further stirred at the same temperature for 1 hour.

Then, the mixture was heated at a temperature of 150° C. and a reduced pressure of 40 torr for 1 hour to distil off water and further heated at 200° C. and a reduced pressure of 5 torr for 0.5 hour to reduce the unreacted monomers, thus obtaining a resin of m-aminophenol formaldehyde.

The thus resulting resin had a composition comprising 8.0% of the monomers and 37.0% of 5 or more substituted phenols structure component.

Estimation of the resin was carried out in an analogous manner to Example 1 to obtain results as shown in Table 3.

TABLE 3

|  | Example 1 | Comparative Example 1 | Example 2 | Example 3 | Example 4 | Example 5 | Example 6 |
|---|---|---|---|---|---|---|---|
| Co-condensate |  |  |  |  |  |  |  |
| Co-condensation Ratio* | 1/1.4 | 0/1 | 1/2 | 1/1.1 | 1/0.5 | 1/1.4 | 1/1.4 |
| Molecular Weight |  |  |  |  |  |  |  |
| Monomers (%) | 9.0 | 8 | 8.0 | 9.0 | 13.0 | 14.0 | 7.0 |
| 5 or more Substituted Phenols Structure Components Content (%) | 48.0 | 37.0 | 47.0 | 44.0 | 35.0 | 33.0 | 55.0 |
| Co-condensate/RFL | 30/100 | 30/100 | 30/100 | 30/100 | 30/100 | 30/100 | 30/100 |
| Co-condensate/Latex | — | — | — | — | — | — | — |
| Initial Bonding Force (kg/cord) | 3.30 | 1.20 | 3.28 | 3.24 | 3.18 | 3.12 | 3.34 |
| Heat Resisting Bonding Force (kg/cord) | 2.82 | 0.81 | 2.76 | 2.72 | 2.80 | 2.66 | 2.72 |

|  | Example 7 | Example 8 | Example 9 | Example 10 | Example 11 | Example 12 | Example 13 |
|---|---|---|---|---|---|---|---|
| Co-condensate |  |  |  |  |  |  |  |
| Co-condensation Ratio* | 1/0.2 | 1/2.4 | 1/1.4 | 1/1.4 | 1/1.4 | 1/1.4 | 1/1.4 |
| Molecular Weight |  |  |  |  |  |  |  |
| Monomers (%) | 10.0 | 9.0 | 9.0 | 9.0 | 9.0 | 9.0 | 9.0 |
| 5 or more Sub- | 45.0 | 46.0 | 48.0 | 48.0 | 48.0 | 48.0 | 48.0 |

TABLE 3-continued

| stituted Phenols Structure Components Content (%) | | | | | | | |
|---|---|---|---|---|---|---|---|
| Co-condensate/RFL | 30/100 | 30/100 | 10/100 | 60/100 | 100/100 | 125/100 | — |
| Co-condensate/Latex | — | — | — | — | — | — | 30/100 |
| Initial Bonding Force (kg/cord) | 2.65 | 3.10 | 3.00 | 3.24 | 3.16 | 3.04 | 3.21 |
| Heat Resisting Bonding Force (kg/cord) | 2.46 | 2.65 | 2.54 | 2.80 | 2.84 | 2.76 | 2.69 |

(Note) *Co-condensation Ratio = Phenol/m-Aminophenol

EXAMPLE 14

94 parts (1 mol) of phenol, 100 parts of water and 0.5 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 70° C., and the mixture was further stirred at the same temperature for 5 hours to obtain an initial condensate of resol type of phenol 246 parts (2 mols) of N-methyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of phenol.N-methyl-m-aminophenol.formaldehyde.

The resulting resin had a composition comprising 10.0% of the monomers and 46.5% of 5 or more substituted phenols structure components.

Estimation of the resin was carried out in an analogous manner to Example 1 to obtain results as shown in Table 4.

EXAMPLE 15

94 parts (1 mol) of phenol, 100 parts of water and 0.5 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 70° C., and the mixture was further stirred at the same temperature for 5 hours. 384 parts (2.8 mols) of N,N-dimethylaminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of phenol.N,N-dimethyl-m-aminophenol.formaldehyde.

The resulting resin had a composition comprising 9.0% of the monomers and 48.0% of 5 or more substituted phenols structure components.

Estimation of the resin was carried out in an analogous manner to Example 1 to obtain results as shown in Table 4.

EXAMPLE 16

94 parts (1 mol) of phenol, 100 parts of water and 0.5 part of calcium hydroxide were charged in a kolben reactor equipped with a thermometer, stirrer, reflux condenser and dropping funnel, to which 89 parts (1.1 mols) of 37% formalin was dropwise added for 0.5 hour while stirring at 70° C., and the mixture was further stirred at the same temperature for 7 hours. 137 parts (1 mol) of N-ethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of phenol.N-ethyl-m-aminophenol.formaldehyde.

The resulting resin had a composition comprising 12.0% of the monomers and 38.0% of 5 or more substituted phenols structure components.

Estimation of the resin was carried out in an analogous manner to Example 1 to obtain results as shown in Table 4.

EXAMPLE 17

94 parts (1 mol) of phenol, 100 parts of water and 0.5 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 70° C., and the mixture was further stirred at the same temperature for 5 hours. 330 parts (2 mols) of N,N-diethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of phenol.N,N-diethyl-m-aminophenol.formaldehyde.

The resulting resin had a composition comprising 6.5% of the monomers and 56.0% of 5 or more substituted phenols structure component.

Estimation of the resin was carried out in an analogous manner to Example 1 to obtain results as shown in Table 4.

EXAMPLES 18 TO 21

The procedure of Example 14 was repeated except changing the mixing ratio of the aqueous alkaline solution of the co-condensation product and RFL, thus obtaining test results as shown in Table 4.

EXAMPLE 22

The procedure of Example 14 was repeated except using a rubber latex having the composition of Example 13 instead of RFL of Example 1 to obtain estimation results shown in Table 4.

EXAMPLE 23

94 parts (1 mol) of phenol, 100 parts of water and 0.5 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 70° C., and the mixture was further stirred at the same temperature for 5 hours. 172.2 part (1.4 mols) of 3-amino-5-methylphenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of phenol.3-amino-5-methylphenol.formaldehyde.

The resulting resin had a composition comprising 8.5% of the monomers and 52% of 5 or more substituted phenols structure components, and a phenol/3-amino-5-methylphenol co-condensation mol ratio of 1/0.5.

C. and a reduced pressure of 5 torr for 1 hour to reduce the unreacted monomers, thus obtaining a co-condensation resin of phenyl.3-N-methylamino-5-methylphenol.formaldehyde.

The resulting resin had a composition comprising 9.5% of the monomers and 54% of 5 or more substituted phenols structure components, and a phenol/3-N-methylamino-5-methylphenol co-condensation mol ratio of 1/1.1.

Estimation of the resin was carried out in an analogous manner to Example 1 to obtain results as shown in Table 4.

TABLE 4

|  | Example 14 | Example 15 | Example 16 | Example 17 | Example 18 | Example 19 |
|---|---|---|---|---|---|---|
| Co-condensate Composition |  |  |  |  |  |  |
| Monomer 1 | phenol | phenol | phenol | phenol | phenol | phenol |
| Monomer 2 | N-methyl-m-aminophenol | N,N-dimethyl-m-aminophenol | N-ethyl-m-aminophenol | N,N-diethyl-m-aminophenol | N-methyl-m-aminophenol | N-methyl-m-aminophenol |
| Molecular Weight |  |  |  |  |  |  |
| Monomer Content (%) | 10.4 | 9.0 | 12.0 | 6.5 | 10.4 | 10.4 |
| 5 or more Substituted Phenols Structure Components Content (%) | 46.5 | 48.0 | 38.0 | 56.0 | 46.5 | 46.5 |
| Mixing Ratio |  |  |  |  |  |  |
| Co-condensate/RFL | 30/100 | 30/100 | 30/100 | 30/100 | 10/100 | 50/100 |
| Co-condensate/Latex | — | — | — | — | — | — |
| Initial Bonding Force | 3.00 | 2.96 | 3.04 | 2.98 | 2.92 | 3.00 |
| Heat Resisting Bonding Force | 2.54 | 2.56 | 2.50 | 2.48 | 2.44 | 2.50 |
| Phenol/Aminophenol Co-condensation Ratio (mol) | 1/1.3 | 1/2.0 | 1/0.7 | 1/1.4 | — | — |

|  | Example 20 | Example 21 | Example 22 | Example 23 | Example 24 |
|---|---|---|---|---|---|
| Co-condensate Composition |  |  |  |  |  |
| Monomer 1 | phenol | phenol | phenol | phenol | phenol |
| Monomer 2 | N-methyl-m-aminophenol | N-methyl-m-aminophenol | N-methyl-m-aminophenol | 3-amino-5-methylphenol | 3-N-methylamino-5-methylphenol |
| Molecular Weight |  |  |  |  |  |
| Monomer Content (%) | 10.4 | 10.4 | 10.4 | 8.5 | 9.5 |
| 5 or more Substituted Phenols Structure Components Content (%) | 46.5 | 46.5 | 46.5 | 52.0 | 54.0 |
| Mixing Ratio |  |  |  |  |  |
| Co-condensate/RFL | 100/100 | 125/100 | — | 30/100 | 30/100 |
| Co-condensate/Latex | — | — | 30/100 | — | — |
| Initial Bonding Force (kg/cord) | 2.94 | 2.86 | 2.98 | 2.94 | 2.98 |
| Heat Resisting Bonding Force (kg/cord) | 2.50 | 2.42 | 2.48 | 2.58 | 2.46 |
| Phenol/Aminophenol Co-condensate Ratio (mol) | — | — | — | 1/1.05 | 1/1.1 |

Estimation of the resin was carried out in an analogous manner to Example 1 to obtain results as shown in Table 4.

EXAMPLE 24

94 parts (1 mol) of phenol, 100 parts of water and 0.5 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 70° C., and the mixture was further-stirred at the same temperature for 5 hours. 191.8 parts (1.4 mols) of 3-N-methylamino-5-methylphenol was then added to the mixture, stirred at 120° C. for 1 hour, then heated at 150° C. and a reduced pressure of 40 torr for 1 hour to distil off water and further heated at 200°

EXAMPLE 25

108 parts (1 mol) of m-cresol, 100 parts of water and 0.54 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 4 hours. 175 parts (1.6 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.m-aminophenol.formaldehyde.

The resulting resin had a composition comprising 9.0% of the monomers and 53.0% of 5 or more substituted phenols structure components, a m-cresol/m-aminophenol co-condensation mol ratio of 1.3 and a softening point of 116° C.

20 parts of the above described co-condensation product was taken as solid and dissolved in an aqueous alkaline solution of 1.2 parts of sodium hydroxide dissolved in 78.8 parts of water. To 28.6 parts of this solution was added 71.4 parts of RFL having the composition shown in Table 1 of Example 1.

The subsequent procedure was carried out in an analogous manner to Example 1, thus obtaining results as shown in Table 5.

EXAMPLE 26

108 parts (1 mol) of m-cresol, 100 parts of water and 0.54 part of calcium hydroxide were charged in a kolben reactor equipped with a thermometer, stirrer, reflux condenser and dropping funnel, to which 162 parts (2 mols) of 37% formalin was dropwise added for 0.5 hour while stirring at 60° C., and the mixture was further stirred at the same temperature for 4 hours. 273 parts (2.5 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.m-aminophenol.formaldehyde.

The resulting resin had a composition comprising 10.0% of the monomers and 44.0% of 5 or more substituted phenols structure components, a m-cresol/m-aminophenol co-condensation mol ratio of $\frac{1}{2}$ and a softening point of 146° C.

Estimation of the resin was carried out in an analogous manner to Example 25 to obtain results as shown in Table 5.

EXAMPLE 27

108 parts (1 mol) of m-cresol, 100 parts of water and 0.54 part of calcium hydroxide were charged in a kolben reactor equipped with a thermometer, stirrer, reflux condenser and dropping funnel, to which 89 parts (1.1 mols) of 37% formalin was dropwise added for 0.5 hour while stirring at 60° C., and the mixture was further stirred at the same temperature for 4 hours. 153 parts (1.4 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.m-aminophenol.formaldehyde.

The resulting resin had a composition comprising 8.0% of the monomers and 38.0% of 5 or more substituted phenols structure components, a m-cresol/m-aminophenol co-condensation mol ratio of 1/1 and a softening point of 118° C.

Estimation of the resin was carried out in an analogous manner to Example 25 to obtain results as shown in Table 5.

EXAMPLE 28

108 parts (1 mol) of m-cresol, 100 parts of water and 0.54 part of calcium hydroxide were charged in a kolben reactor equipped with a thermometer, stirrer, reflux condenser and dropping funnel, to which 80 parts (1 mol) of 37% formalin was dropwise added for 1 hour while stirring at 60° C., and the mixture was further stirred at the same temperature for 7 hours. 98 parts (0.9 mol) of m-aminophenol was then added to the mixture, stirred at 130° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.m-aminophenol.formaldehyde.

The resulting resin had a composition comprising 11.0% of the monomers and 45.0% of 5 or more substituted phenols structure components, a m-cresol/m-aminophenol co-condensation mol ratio of 1/0.5, and a softening point of 108° C.

Estimation of the resin was carried out in an analogous manner to Example 25 to obtain results as shown in Table 5.

EXAMPLE 29

108 parts (1 mol) of m-cresol, 100 parts of water and 0.54 part of calcium hydroxide were charged in a kolben reactor equipped with a thermometer, stirrer, reflux condenser and dropping funnel, to which 114 parts (1.4 mols) of 37% formalin was dropwise added for 1 hour while stirring at 60° C., and the mixture was further stirred at the same temperature for 4 hours. 175 parts (1.6 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.m-aminophenol.formaldehyde.

The resulting resin had a composition comprising 13.0% of the monomers and 58.0% of 5 or more substituted phenols structure components, a m-cresol/m-aminophenol co-condensation mol ratio of 1/1.3 and a softening point of 126° C.

Estimation of the resin was carried out in an analogous manner to Example 25 to obtain results as shown in Table 5.

EXAMPLE 30

108 parts (1 mol) of m-cresol, 100 parts of water and 0.54 part of sodium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 4 hours. 164 parts (1.5 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of m-cresol.m-aminophenol.formaldehyde.

The resulting resin had a composition comprising 5.0% of the monomers and 58.0% of 5 or more substituted phenols structure components, a m-cresol/m-aminophenol co-condensation mol ratio of 1/1.3 and a softening point of 136° C.

Estimation of the resin was carried out in an analogous manner to Example 25 to obtain results as shown in Table 5.

EXAMPLE 31

108 parts (1 mol) of m-cresol, 100 parts of water and 0.54 part of calcium hydroxide were charged in a kolben reactor equipped with a thermometer, stirrer, reflux condenser and dropping funnel, to which 80 parts (1 mol) of 37% formalin was dropwise added for 1 hour while stirring at 60° C., and the mixture was further stirred at the same temperature for 7 hours. 65 parts (0.6 mol) of m-aminophenol was then added to the mixture, stirred at 130° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.m-aminophenol.formaldehyde.

The resulting resin had a composition comprising 11.5% of the monomers and 43% of 5 or more substituted phenols structure components, a m-cresol/m-aminophenol co-condensation mol ratio of 1/0.35 and a softening point of 103° C.

Estimation of the resin was carried out in an analogous manner to Example 25 to obtain results as shown in Table 5.

EXAMPLE 32

108 parts (1 mol) of m-cresol, 100 parts of water and 0.54 part of calcium hydroxide were charged in a kolben reactor equipped with a thermometer, stirrer, reflux condenser and dropping funnel, to which 162 parts (2 mols) of 37% formalin was dropwise added for 0.5 hour while stirring at 60° C., and the mixture was further stirred at the same temperature for 4 hours. 327 parts (3 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.m-aminophenol.formaldehyde.

The resulting resin had a composition comprising 10.0% of the monomers and 46.5% of 5 or more substituted phenols structure components, a m-cresol/m-aminophenol co-condensation mol ratio of 1/2.6 and a softening point of 154° C.

Estimation of the resin was carried out in an analogous manner to Example 25 to obtain results as shown in Table 5.

EXAMPLES 33 TO 36

The procedure of Example 25 was repeated except changing the mixing ratio of the aqueous alkaline solution of the co-condensation product and RFL, thus obtaining test results shown in Table 5.

EXAMPLE 37

The procedure of Example 25 was repeated except using the rubber latex of Example 13 instead of RFL of Example 1 to obtain results of Table 5.

COMPARATIVE EXAMPLE 2

109 parts (1 mol) of m-aminophenol, 110 parts of methanol and 0.6 part of calcium hydroxide were charged in a kolben reactor equipped with a thermometer, stirrer, reflux condenser and dropping funnel, to which 105 parts (1.3 mols) of 37% formalin was dropwise added for 0.5 hour at a temperature of 120° C., and the mixture was further stirred at the same temperature for 1 hour.

Then, the mixture was heated at a temperature of 150° C. and a reduced pressure of 40 torr for 1 hour to distill off water and further heated at 200° C. and a reduced pressure of 5 torr for 0.5 hour to reduce the unreacted monomers, thus obtaining a resin of m-aminophenol.formaldehyde.

The thus resulting resin had a composition comprising 8.0% of the monomers and 37.0% of 5 or more substituted phenols structure components.

Estimation of the resin was carried out in an analogous manner to Example 25 to obtain results as shown in Table 5.

TABLE 5

|  | Example 25 | Comparative Example 2 | Example 26 | Example 27 | Example 28 | Example 29 | Example 30 |
| --- | --- | --- | --- | --- | --- | --- | --- |
| Co-condensate |  |  |  |  |  |  |  |
| Co-condensation Ratio* | 1/1.3 | 0/1 | 1/2 | 1/1 | 1/0.5 | 1/1.3 | 1/1.3 |
| Molecular Weight |  |  |  |  |  |  |  |
| Monomers (%) | 9.0 | 8 | 10 | 8.0 | 11 | 13.0 | 5.0 |
| 5 or more Substituted Phenols Structure Components Content (%) | 53 | 37.0 | 44 | 38.0 | 45 | 50.0 | 58.0 |
| Co-condensate/RFL | 40/100 | 40/100 | 40/100 | 40/100 | 40/100 | 40/100 | 40/100 |
| Co-condensate/Latex | — | — | — | — | — | — | — |
| Initial Bonding Force (kg/cord) | 3.34 | 1.20 | 3.32 | 3.30 | 3.24 | 3.28 | 3.34 |
| Heat Resisting Bonding Force (kg/cord) | 2.30 | 0.81 | 2.72 | 2.76 | 2.80 | 2.74 | 2.86 |

|  | Example 31 | Example 32 | Example 33 | Example 34 | Example 35 | Example 36 | Example 37 |
| --- | --- | --- | --- | --- | --- | --- | --- |
| Co-condensate |  |  |  |  |  |  |  |
| Co-condensation Ratio* | 1/0.35 | 1/2.6 | 1/1.3 | 1/1.3 | 1/1.3 | 1/1.3 | 1/1.3 |
| Molecular Weight |  |  |  |  |  |  |  |
| Monomers (%) | 11.5 | 10.0 | 9.0 | 9.0 | 9.0 | 9.0 | 9.0 |
| 5 or more Substituted Phenols Structure Components Content (%) | 43.0 | 46.5 | 53.0 | 53.0 | 53.0 | 53.0 | 53.0 |

TABLE 5-continued

| | | | | | | | |
|---|---|---|---|---|---|---|---|
| Co-condensate/RFL | 40/100 | 40/100 | 10/100 | 60/100 | 100/100 | 125/100 | — |
| Co-condensate/Latex | — | — | — | — | — | — | 40/100 |
| Initial Bonding Force (kg/cord) | 2.86 | 2.96 | 3.06 | 3.28 | 3.20 | 3.08 | 3.26 |
| Heat Resisting Bonding Force (kg/cord) | 2.44 | 2.50 | 2.66 | 2.84 | 2.86 | 2.74 | 2.74 |

(Note) *Co-condensation Ratio (mol ratio) = m-Cresol/m-Aminophenol

EXAMPLE 38

108 parts (1 mol) of m-cresol, 100 parts of water and 0.5 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 5 hours to obtain a resol type initial condensate of m-cresol. 197 parts (1.6 mols) of N-methyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.N-methyl-m-aminophenol.formaldehyde.

The resulting resin had a composition comprising 8.5% of the monomers and 54.0% of 5 or more substituted phenols structure components.

Estimation of the resin was carried out in an analogous manner to Example 25 to obtain results as shown in Table 6.

EXAMPLE 39

108 parts (1 mol) of m-cresol, 100 parts of water and 0.5 part of calcium hydroxide were charged in a kolben reactor equipped with a thermometer, stirrer, reflux condenser and dropping funnel, to which 162 parts (2 mols) of 37% formalin was dropwise added for 0.5 hour while stirring at 60° C., and the mixture was further stirred at the same temperature for 4 hours. 343 parts (2.5 mols) of N,N-dimethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.N,N-dimethyl-m-aminophenol.-formaldehyde.

The resulting resin had a composition comprising 11.0% of the monomers and 47.0% of 5 or more substituted phenols structure components.

Estimation of the resin was carried out in an analogous manner to Example 38 to obtain results as shown in Table 6.

EXAMPLE 40

108 parts (1 mol) of m-cresol, 100 parts of water and 0.5 part of calcium hydroxide were charged in a kolben reactor equipped with a thermometer, stirrer, reflux condenser and dropping funnel, to which 89 parts (1.1 mols) of 37% formalin was dropwise added for 0.5 hour while stirring at 60° C., and the mixture was further stirred at the same temperature for 4 hours. 192 parts (1.4 mols) of N-ethyl-m-aminophenol was then added to the mixture, stirred at 120° C. for 1 hour, then heated at 150° C. and a reduced pressure of 40 torr for 1 hour to distill off water and further heated at 200° C. and a reduced pressure of 5 torr for 0.5 hour to reduce the unreacted monomers, thus obtaining a co-condensation resin of m-cresol.N-ethyl-m-aminophenol.formaldehyde.

The resulting resin had a composition comprising 10.0% of the monomers and 42.0% of 5 or more substituted phenols structure components.

Estimation of the resin was carried out in an analogous manner to Example 38 to obtain results as shown in Table 6.

EXAMPLE 41

108 parts (1 mol) of m-cresol, 100 parts of water and 0.5 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 4 hours. 264 parts (1.6 mols) of N,N-diethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.N,N-diethyl-m-aminophenol.formaldehyde.

The resulting resin had a composition comprising 7.0% of the monomers and 56.5% of 5 or more substituted phenols structure components.

Estimation of the resin was carried out in an analogous manner to Example 38 to obtain results as shown in Table 6.

EXAMPLES 42 TO 44

The procedure of Example 38 was repeated except changing the mixing ratio of the aqueous alkaline solution of the co-condensation product and RFL, thus obtaining test results shown in Table 6.

EXAMPLE 45

The procedure of Example 38 was repeated except using the rubber latex of Example 13 instead of RFL of Example 1 to obtain estimation results as shown in Table 6.

EXAMPLE 46

108 parts (1 mol) of m-cresol, 100 parts of water and 0.5 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 4 hours. 172 parts (1.4 mols) of 3-amino-5-methylphenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-cresol.3-amino-5-methylphenol.formaldehyde.

The resulting resin had a composition comprising 10.5% of the monomers and 48.5% of 5 or more substituted phenols structure components, and a m-cresol/3-amino-5-methylphenol co-condensation mol ratio of 1/1.15.

Estimation of the resin was carried out in an analogous manner to Example 38 to obtain results as shown in Table 6.

densation resin of m-cresol.3-N-methylamino-5-methylphenol.formaldehyde.

The resulting resin had a composition comprising 8.5% of the monomers and 41.0% of 5 or more substituted phenols structure components, and a m-cresol/3-N-methylamino-5-methylphenol co-condensation mol ratio of 1/1.1.

Estimation of the resin was carried out in an analogous manner to Example 38 to obtain results as shown in Table 6.

TABLE 6

|  | Example 38 | Example 39 | Example 40 | Example 41 | Example 42 |
| --- | --- | --- | --- | --- | --- |
| Co-condensate Composition |  |  |  |  |  |
| Monomer 1 | m-cresol | m-cresol | m-cresol | m-cresol | m-cresol |
| Monomer 2 | N-methyl-m-aminophenol | N,N-dimethyl-m-aminophenol | N-ethyl-m-aminophenol | N,N-diethyl-m-aminophenol | N-methyl-m-aminophenol |
| Molecular Weight |  |  |  |  |  |
| Monomer Content (%) | 8.5 | 11.0 | 10.0 | 7.0 | 8.5 |
| 5 or more Substituted Phenols Structure Components Content (%) | 54.0 | 47.0 | 42.0 | 56.5 | 54.0 |
| Mixing Ratio |  |  |  |  |  |
| Co-condensate/RFL | 40/100 | 40/100 | 40/100 | 40/100 | 10/100 |
| Co-condensate/Latex | — | — | — | — | — |
| Initial Bonding Force (kg/cord) | 3.12 | 3.06 | 3.08 | 3.04 | 3.04 |
| Heat Resisting Bonding Force (kg/cord) | 2.64 | 2.60 | 2.55 | 2.50 | 2.54 |
| m-Cresol/Aminophenol Co-condensation Mol Ratio | 1/1.3 | 1/1.8 | 1/1 | 1/1.2 | — |

|  | Example 43 | Example 44 | Example 45 | Example 46 | Example 47 |
| --- | --- | --- | --- | --- | --- |
| Co-condensate Composition |  |  |  |  |  |
| Monomer 1 | m-cresol | m-cresol | m-cresol | m-cresol | m-cresol |
| Monomer 2 | N-methyl-m-aminophenol | N-methyl-m-aminophenol | N-methyl-m-aminophenol | 3-amino-5-methylphenol | 3-N-methylamino-5-methylphenol |
| Molecular Weight |  |  |  |  |  |
| Monomer Content (%) | 8.5 | 8.5 | 8.5 | 10.5 | 8.5 |
| 5 or more Substituted Phenols Structure Components Content (%) | 54.0 | 54.0 | 54.0 | 48.5 | 41.0 |
| Mixing Ratio |  |  |  |  |  |
| Co-condensate/RFL | 100/100 | 125/100 | — | 40/100 | 40/100 |
| Co-condensate/Latex | — | — | 40/100 | — | — |
| Initial Bonding Force (kg/cord) | 3.10 | 2.95 | 3.08 | 3.06 | 3.10 |
| Heat Resisting Bonding Force (kg/cord) | 2.56 | 2.44 | 2.52 | 2.61 | 2.56 |
| m-Cresol/Aminophenol Co-condensation Mol Ratio | — | — | — | 1/1.15 | 1/1.1 | gous manner to Example 38 to obtain results as shown in Table 6.

EXAMPLE 47

108 parts (1 mol) of m-cresol, 100 parts of water and 0.5 part of calcium hydroxide were charged in a kolben reactor equipped with a thermometer, stirrer, reflux condenser and dropping funnel, to which 114 parts (1.4 mols) of 37% formalin was dropwise added for 1 hour while stirring at 60° C., and the mixture was further stirred at the same temperature for 4 hours. 192 parts (1.4 mols) of 3-N-methylamino-5-methylphenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-con-

EXAMPLE 48

124 parts (1 mol) of m-methoxyphenol, 120 parts of water and 0.6 part of calcium hydroxide were charged in a kolben reactor equipped with a thermometer, stirrer, reflux condenser and dropping funnel, to which 105 parts (1.3 mols) of 37% formalin was dropwise added for 0.5 hour while stirring at 60° C., and the mixture was further stirred at the same temperature for 1.5 hours. 186 parts (1.7 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-methoxyphenol.m-aminophenol.formaldehyde.

The resulting resin had a composition comprising 8.0% of the monomers and 52.0% of 5 or more substituted phenols structure components, a m-methoxyphenol/m-aminophenol co-condensation mol ratio of 1/1.4 and a softening point of 123° C.

20 parts of the above described co-condensation product was taken as solid and dissolved in an aqueous alkaline solution of 1.2 parts of sodium hydroxide dissolved in 78.8 parts of water. To 33.3 parts of this solution was added 66.7 parts of RFL having the composition shown in Table 1 of Example 1.

The subsequent procedure was carried out in an analogous manner to Example 1, thus obtaining results as shown in Table 7.

EXAMPLE 49

124 parts (1 mol) of m-methoxyphenol, 120 parts of water and 0.6 part of calcium hydroxide were charged in a kolben reactor equipped with a thermometer, stirrer, reflux condenser and dropping funnel, to which 146 parts (1.8 mols) of 37% formalin was dropwise added for 0.5 hour while stirring at 60° C., and the mixture was further stirred at the same temperature for 1.5 hours. 306 parts (2.8 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-methoxyphenol.m-aminophenol.formaldehyde.

The resulting resin had a composition comprising 9.0% of the monomers and 54.0% of 5 or more substituted phenols structure components, a m-methoxyphenol/m-aminophenol co-condensation mol ratio of 1/2 and a softening point of 137° C.

Estimation of the resin was carried out in an analogous manner to Example 48 to obtain results as shown in Table 7.

EXAMPLE 50

124 parts (1 mol) of m-methoxyphenol, 120 parts of water and 0.6 part of calcium hydroxide were charged in a kolben reactor equipped with a thermometer, stirrer, reflux condenser and dropping funnel, to which 97 parts (1.2 mols) of 37% formalin was dropwise added for 0.5 hour while stirring at 60° C., and the mixture was further stirred at the same temperature for 1 hour. 186 parts (1.7 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-methoxyphenol.m-aminophenol.formaldehyde.

The resulting resin had a composition comprising 10.0% of the monomers and 43.0% of 5 or more substituted phenols structure components, a m-methoxyphenol/m-aminophenol co-condensation mol ratio of 1/1 and a softening point of 120° C.

Estimation of the resin was carried out in an analogous manner to Example 48 to obtain results as shown in Table 7.

EXAMPLE 51

124 parts (1 mol) of m-methoxyphenol, 100 parts of water and 0.6 part of calcium hydroxide were charged in a kolben reactor equipped with a thermometer, stirrer, reflux condenser and dropping funnel, to which 80 parts (1 mol) of 37% formalin was dropwise added for 0.5 hour while stirring at 60° C., and the mixture was further stirred at the same temperature for 2 hours. 120 parts (1.1 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-methoxyphenol.m-aminophenol.formaldehyde.

The resulting resin had a composition comprising 8.0% of the monomers and 40.0% of 5 or more substituted phenols structure components, a m-methoxyphenol/m-aminophenol co-condensation mol ratio of 1/0.5 and a softening point of 107° C.

Estimation of the resin was carried out in an analogous manner to Example 48 to obtain results as shown in Table 7.

EXAMPLE 52

124 parts (1 mol) of m-methoxyphenol, 120 parts of water and 0.6 part of calcium hydroxide were charged in a kolben reactor equipped with a thermometer, stirrer, reflux condenser and dropping funnel, to which 89 parts (1.1 mols) of 37% formalin was dropwise added for 0.1 hour while stirring at 60° C., and the mixture was further stirred at the same temperature for 1.5 hours. 186 parts (1.7 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-methoxyphenol.m-aminophenol.formaldehyde.

The resulting resin had a composition comprising 14.5% of the monomers and 37.0% of 5 or more substituted phenols structure components, a m-methoxyphenol/m-aminophenol co-condensation mol ratio of 1/1.4 and a softening point of 118° C.

Estimation of the resin was carried out in an analogous manner to Example 48 to obtain results as shown in Table 7.

EXAMPLE 53

124 parts (1 mol) of m-methoxyphenol, 120 parts of water and 0.6 part of sodium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 1.5 hours. 186 parts (1.7 mols) of m-aminophenol was then added to the mixture, stirred at 120° C. for 2 hours, then heated at 150° C. and a reduced pressure of 40 torr for 1 hour to distil off water and further heated at 200° C. and a reduced pressure of 5 torr for 1.0 hour to reduce the unreacted monomers, thus obtaining a co-condensation resin of m-methoxyphenol.m-aminophenol.formaldehyde.

The resulting resin had a composition comprising 5.0% of the monomers and 58.0% of 5 or more substituted phenols structure components, a m-methoxyphenol/m-aminophenol co-condensation mol ratio of 1/1.4 and a softening point of 128° C.

Estimation of the resin was carried out in an analogous manner to Example 48 to obtain results as shown in Table 7.

EXAMPLE 54

124 parts (1 mol) of m-methoxyphenol, 100 parts of water and 0.6 part of calcium hydroxide were charged in a kolben reactor equipped with a thermometer, stirrer, reflux condenser and dropping funnel, to which 80 parts (1 mol) of 37% formalin was dropwise added for 0.5 hour while stirring at 60° C., and the mixture was further stirred at the same temperature for 2 hours. 65 parts (0.6 mol) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-methoxyphenol.m-aminophenol.formaldehyde.

The resulting resin had a composition comprising 9.5% of the monomers and 43.0% of 5 or more substituted phenols structure components, a m-methoxyphenol/m-aminophenol co-condensation mol ratio of 1/0.3 and a softening point of 98° C.

Estimation of the resin was carried out in an analogous manner to Example 48 to obtain results as shown in Table 7.

EXAMPLE 55

124 parts (1 mol) of m-methoxyphenol, 120 parts of water and 0.6 part of calcium hydroxide were charged in a kolben reactor equipped with a thermometer, stirrer, reflux condenser and dropping funnel, to which 146 parts (1.8 mols) of 37% formalin was dropwise added for 0.5 hour while stirring at 60° C., and the mixture was further stirred at the same temperature for 1.5 hours. 327 parts (3 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-methoxyphenol.m-aminophenol.formaldehyde.

The resulting resin had a composition comprising 10.0% of the monomers and 51.5% of 5 or more substituted phenols structure components, a m-methoxyphenol/m-aminophenol co-condensation mol ratio of 1/2.5 and a softening point of 140° C.

Estimation of the resin was carried out in an analogous manner to Example 48 to obtain results as shown in Table 7.

EXAMPLES 56 TO 59

The procedure of Example 48 was repeated except changing the mixing ratio of the aqueous alkaline solution of the co-condensation product and RFL, thus obtaining test results shown in Table 7.

EXAMPLE 60

The procedure of Example 48 was repeated except using the rubber latex of Example 13 instead of RFL of Example 1 to obtain results of Table 7.

COMPARATIVE EXAMPLE 3

109 parts (1 mol) of m-aminophenol, 110 parts of methanol and 0.6 part of calcium hydroxide were charged in a kolben reactor equipped with a thermometer, stirrer, reflux condenser and dropping funnel, to which 105 parts (1.3 mols) of 37% formalin was dropwise added for 0.5 hour at a temperture of 120° C., and the mixture was further stirred at the same temperature for 1 hour.

Then, the mixture was heated at a temperature of 150° C. and a reduced pressure of 40 torr for 1 hour to distil off water and further heated at 200° C. and a reduced pressure of 5 torr for 0.5 hour to reduce the unreacted monomers, thus obtaining a resin of m-aminophenol.formaldehyde.

The thus resulting resin had a composition comprising 8.0% of the monomers and 37.0% of 5 or more substituted phenols structure components.

Estimation of the resin was carried out in an analogous manner to Example 48 to obtain results as shown in Table 7.

TABLE 7

|  | Example 48 | Comparative Example 3 | Example 49 | Example 50 | Example 51 | Example 52 | Example 53 |
|---|---|---|---|---|---|---|---|
| Co-condensate |  |  |  |  |  |  |  |
| Co-condensation Ratio* | 1/1.4 | 0/1 | 1/2 | 1/1 | 1/0.5 | 1/1.4 | 1/1.4 |
| Molecular Weight |  |  |  |  |  |  |  |
| Monomers (%) | 8 | 8 | 9 | 10.0 | 8.0 | 1.45 | 5.0 |
| 5 or more Substituted Phenols Structure Components Content (%) | 52.0 | 37.0 | 54.0 | 43.0 | 40.0 | 37.0 | 58.0 |
| Co-condensate/RFL | 50/100 | 50/100 | 50/100 | 50/100 | 50/100 | 50/100 | 50/100 |
| Co-condensate/Latex | — | — | — | — | — | — | — |
| Initial Bonding Force (kg/cord) | 3.36 | 1.20 | 3.30 | 3.30 | 3.24 | 3.36 | 3.34 |
| Heat Resisting Bonding Force (kg/cord) | 2.90 | 0.81 | 2.84 | 2.94 | 2.86 | 2.84 | 2.92 |

|  | Example 54 | Example 55 | Example 56 | Example 57 | Example 58 | Example 59 | Example 60 |
|---|---|---|---|---|---|---|---|
| Co-condensate |  |  |  |  |  |  |  |
| Co-condensation Ratio* | 1/0.3 | 1/2.5 | 1/1.4 | 1/1.4 | 1/1.4 | 1/1.4 | 1/1.4 |
| Molecular Weight |  |  |  |  |  |  |  |

TABLE 7-continued

| | | | | | | | |
|---|---|---|---|---|---|---|---|
| Monomers (%) | 9.5 | 10.0 | 8.0 | 8.0 | 8.0 | 8.0 | 8.0 |
| 5 or more Substituted Phenols Structure Components Content (%) | 43.0 | 51.5 | 52.0 | 52.0 | 52.0 | 52.0 | 52.0 |
| Co-condensate/RFL | 50/100 | 50/100 | 10/100 | 30/100 | 100/100 | 125/100 | — |
| Co-condensate/Latex | — | — | — | — | — | — | 50/100 |
| Initial Bonding Force (kg/cord) | 2.62 | 3.02 | 2.98 | 3.30 | 3.24 | 2.10 | 3.28 |
| Heat Resisting Bonding Force (kg/cord) | 2.32 | 2.68 | 2.76 | 2.84 | 2.88 | 2.69 | 2.71 |

(Note) *Co-condensation Ratio (mol) = m-methoxyphenol/m-aminophenol

EXAMPLE 61

124 parts (1 mol) of m-methoxyphenol, 120 parts of water and 0.6 part of calcium hydroxide were charged in a kolben reactor equipped with a thermometer, stirrer, reflux condenser and dropping funnel, to which 105 parts (1.3 mols) of 37% formalin was dropwise added for 0.5 hour while stirring at 60° C., and the mixture was further stirred at the same temperature for 1.5 hours to obtain a resol type initial condensate of m-methoxyphenol. 209 parts (1.7 mols) of N-methyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-methoxyphenol.N-methyl-m-aminophenol.formaldehyde.

The resulting resin had a composition comprising 10.0% of the monomers and 53.0% of 5 or more substituted phenols structure components.

Estimation of the resin was carried out in an analogous manner to Example 48 to obtain results as shown in Table 8.

EXAMPLE 62

124 parts (1 mol) of m-methoxyphenol, 120 parts of water and 0.6 part of calcium hydroxide were charged in a kolben reactor equipped with a thermometer, stirrer, reflux condenser and dropping funnel, to which 105 parts (1.3 mols) of 37% formalin was dropwise added for 0.5 hour while stirring at 60° C., and the mixture was further stirred at the same temperature for 1.5 hours. 233 parts (1.7 mols) of N,N-dimethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of m-methoxyphenol.N,N-dimethyl-m-aminophenol.formaldehyde.

The resulting resin had a composition comprising 8.0% of the monomers and 48.5% of 5 or more substituted phenols structure components.

Estimation of the resin was carried out in an analogous manner to Example 61 to obtain results as shown in Table 8.

EXAMPLE 63

124 parts (1 mol) of m-methoxyphenol, 120 parts of water and 0.6 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 1.5 hours. 233 parts (1.7 mols) of N-ethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of m-methoxyphenol.N-ethyl-m-aminophenol.formaldehyde.

The resulting resin had a composition comprising 6.0% of the monomers and 57.5% of 5 or more substituted phenols structure components.

Estimation of the resin was carried out in an analogous manner to Example 61 to obtain results as shown in Table 8.

EXAMPLE 64

124 parts (1 mol) of m-methoxyphenol, 120 parts of water and 0.6 part of calcium hydroxide were charged in a kolben reactor equipped with a thermometer, stirrer, reflux condenser and dropping funnel, to which 89 parts (1.1 mols) of 37% formalin was dropwise added for 0.5 hour while stirring at 60° C., and the mixture was further stirred at the same temperature for 1.5 hours. 281 parts (1.7 mols) of N,N-diethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of m-methoxyphenol.N,N-diethyl-m-aminophenol.formaldehyde.

The resulting resin had a composition comprising 13.5% of the monomers and 40.0% of 5 or more substituted phenols structure components.

Estimation of the resin was carried out in an analogous manner to Example 61 to obtain results as shown in Table 8.

EXAMPLES 65 TO 67

The procedure of Example 61 was repeated except changing the mixing ratio of the aqueous alkaline solution of the co-condensation product and RFL, thus obtaining test results shown in Table 8.

EXAMPLE 68

The procedure of Example 61 was repeated except using the rubber latex of Example 13 instead of RFL of Example 1 to obtain estimation results shown in Table 8.

EXAMPLE 69

124 parts (1 mol) of m-methoxyphenol, 120 parts of water and 0.6 part of calcium hydroxide were charged in a kolben reactor equipped with a thermometer, stirrer, reflux condenser and dropping funnel, to which 97 parts (1.2 mols) of 37% formalin was dropwise added for 0.5 hour while stirring at 60° C., and the mixture was further stirred at the same temperature for 1.5 hours. 209 part (1.7 mols) of 3-amino-5-methylphenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of m-methoxyphenol.3-amino-5-methylphenol.formaldehyde.

The resulting resin had a composition comprising 9.0% of the monomers and 43.0% of 5 or more substituted phenols structure components and a m-methoxyphenol/3-amino-5-methylphenol co-condensation mol ratio of 1/1.3.

Estimation of the resin was carried out in an analogous manner to Example 61 to obtain results as shown in Table 8.

parts (1.2 mols) of 37% formalin was dropwise added for 1 hour while stirring at 60° C., and the mixture was further stirred at the same temperature for 1.5 hours. 233 parts (1.7 mols) of 3N-methylamino-5-methylphenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of m-methoxyphenol.3-N-methylamino-5-methylphenol.formaldehyde.

The resulting resin had a composition comprising 9.5% of the monomers and 38.5% of 5 or more substituted phenols structure components, and a m-methoxyphenol/3-N-methylamino-5-methylphenol co-condensation mol ratio of 1/1.4.

Estimation of the resin was carried out in an analogous manner to Example 61 to obtain results as shown in Table 8.

TABLE 8

|  | Example 61 | Example 62 | Example 63 | Example 64 | Example 65 |
|---|---|---|---|---|---|
| Co-condensate Composition |  |  |  |  |  |
| Monomer 1 | m-methoxyphenol | m-methoxyphenol | m-methoxyphenol | m-methoxyphenol | m-methoxyphenol |
| Monomer 2 | N-methyl-m-aminophenol | N,N-dimethyl-m-phenol | N-ethyl-m-aminophenol | N,N-diethyl-m-aminophenol | N-methyl-m-aminophenol |
| Molecular Weight |  |  |  |  |  |
| Monomer Content (%) | 10.0 | 8.0 | 6.0 | 13.5 | 10.0 |
| 5 or more Substituted Phenols Structure Components Content (%) | 53.0 | 48.5 | 57.5 | 40.0 | 53.0 |
| Mixing Ratio |  |  |  |  |  |
| Co-condensate/RFL | 50/100 | 50/100 | 50/100 | 50/100 | 10/100 |
| Co-condensate/Latex | — | — | — | — | — |
| Initial Bonding Force | 3.08 | 3.00 | 3.00 | 3.04 | 3.00 |
| Heat Resisting Bonding Force (kg/cord) | 2.56 | 2.60 | 2.52 | 2.64 | 2.42 |
| m-Methoxyphenol/Aminophenol Co-condensation Mol Ratio | 1/1.4 | 1/1.3 | 1/1.3 | 1/1.2 | 1/1.4 |

|  | Example 66 | Example 67 | Example 68 | Example 69 | Example 70 |
|---|---|---|---|---|---|
| Co-condensate Composition |  |  |  |  |  |
| Monomer 1 | m-methoxyphenol | m-methoxyphenol | m-methoxyphenol | m-methoxyphenol | m-methoxyphenol |
| Monomer 2 | N-methyl-m-aminophenol | N-methyl-m-aminophenol | N-methyl-m-aminophenol | 3-amino-5-methylphenol | 3-N-methylamino-5-methylphenol |
| Molecular Weight |  |  |  |  |  |
| Monomer Content (%) | 10.0 | 10.0 | 10.0 | 9.0 | 9.5 |
| 5 or more Substituted Phenols Structure Components Content (%) | 53.0 | 53.0 | 53.0 | 43.0 | 38.5 |
| Mixing Ratio |  |  |  |  |  |
| Co-condensate/RFL | 100/100 | 125/100 | — | 50/100 | 50/100 |
| Co-condensate/Latex | — | — | 50/100 | — | — |
| Initial Bonding Force | 3.00 | 2.84 | 2.98 | 3.02 | 2.98 |
| Heat Resisting Bonding Force (kg/cord) | 2.44 | 2.38 | 2.50 | 2.64 | 2.50 |
| m-Methoxyphenol/Aminophenol Co-condensation Mol Ratio | 1/1.4 | 1/1.4 | 1/1.4 | 1/1.3 | 1/1.4 | in Table 8.

EXAMPLE 70

124 parts (1 mol) of m-methoxyphenol, 120 parts of water and 0.6 part of calcium hydroxide were charged in a kolben reactor equipped with a thermometer, stirrer, reflux condenser and dropping funnel, to which 97

EXAMPLE 71

122 parts (1 mol) of 3,5-xylenol, 120 parts of water and 0.6 part of calcium hydroxide were charged in a kolben reactor equipped with a thermometer, stirrer, reflux condenser and dropping funnel, to which 114 parts (1.4 mols) of 37% formalin was dropwise added for 1 hour while stirring at 60° C., and the mixture was further stirred at the same temperature for 1.5 hours to obtain a resol type initial condensate of 3,5-xylenol. 175 parts (1.6 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of 3,5-xylenol.m-aminophenol.formaldehyde.

The resulting resin had a composition comprising 6.5% of the monomers and 56.5% of 5 or more substituted phenols structure components, and a 3,5-xylenol/m-aminophenol co-condensation mol ratio of 1/1.2.

20 parts of the above described co-condensation product was taken as solid and dissolved in an aqueous alkaline solution of 1.2 parts of sodium hydroxide dissolved in 78.8 parts of water. To 33.3 parts of this solution was added 66.7 parts of RFL having the composition shown in Table 1 of Example 1.

The subsequent procedure was carried out in an analogous manner to Example 1, thus obtaining results as shown in Table 9.

EXAMPLE 72

150 parts (1 mol) of 3-methyl-5-isopropylphenol, 150 parts of water and 0.75 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 2 hours. 175 parts (1.6 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of 3-methyl-5-isopropylphenol.m-aminophenol.-formaldehyde.

The resulting resin had a composition comprising 5.5% of the monomers and 58.0% of 5 or more substituted phenols structure components, and a 3-methyl-5-isopropylphenol/m-aminophenol co-condensation mol ratio of 1/1.15.

Estimation of the resin was carried out in an analogous manner to Example 71 to obtain results as shown in Table 9.

EXAMPLE 73

122 parts (1 mol) of m-ethylphenol, 120 parts of water and 0.6 part of calcium hydroxide were charged in a kolben reactor equipped with a thermometer, stirrer, reflux condenser and dropping funnel, to which 162 parts (2 mols) of 37% formalin was dropwise added for 0.5 hour while stirring at 60° C., and the mixture was further stirred at the same temperature for 4 hour. 175 parts (1.6 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-ethylphenol.m-aminophenol.formaldehyde.

The resulting resin had a composition comprising 4.5% of the monomers and 58.5% of 5 or more substituted phenols structure components, and a m-ethylphenol/m-aminophenol co-condensation mol ratio of 1/1.4.

Estimation of the resin was carried out in an analogous manner to Example 71 to obtain results as shown in Table 9.

EXAMPLE 74

150 parts (1 mol) of m-t-butylphenol, 150 parts of water and 0.75 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 5 hours. 175 parts (1.6 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of m-t-butylphenol.m-aminophenol.formaldehyde.

The resulting resin had a composition comprising 8.0% of the monomers and 50.5% of 5 or more substituted phenols structure components, and a m-t-butylphenol/m-aminophenol co-condensation mol ratio of 1/1.2.

Estimation of the resin was carried out in an analogous manner to Example 71 to obtain results as shown in Table 9.

EXAMPLE 75

136 parts (1 mol) of m-ethoxyphenol, 140 parts of water and 0.7 part of calcium hydroxide were charged in a kolben reactor equipped with a thermometer, stirrer, reflux condenser and dropping funnel, to which 105 parts (1.3 mols) of 37% formalin was dropwise added for 0.5 hour while stirring at 60° C., and the mixture was further stirred at the same temperature for 1.5 hours. 186 parts (1.7 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of m-ethoxyphenol.m-aminophenol.formaldehyde.

The resulting resin had a composition comprising 7.5% of the monomers and 48.5% of 5 or more substituted phenols structure components, a co-condensation mol ratio of 1/1.3.

Estimation of the resin was carried out in an analogous manner to Example 71 to obtain results as shown in Table 9.

EXAMPLE 76

166 parts (1 mol) of m-butoxyphenol, 170 parts of water and 0.8 part of calcium hydroxide were charged in a kolben reactor equipped with a thermometer, stirrer, reflux condenser and dropping funnel, to which 105 parts (1.3 mols) of 37% formalin was dropwise added for 0.5 hour while stirring at 60° C., and the mixture was further stirred at the same temperature for 2.5 hours. 186 parts (1.7 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of m-butoxyphenol.m-aminophenol.formaldehyde.

The resulting resin had a composition comprising 6.0% of the monomers and 49.5% of 5 or more substituted phenols structure components, and a m-butoxyphenol/m-aminophenol co-condensation mol ratio of 1/1.3.

Estimation of the resin was carried out in an analogous manner to Example 71 to obtain results as shown in Table 9.

EXAMPLE 77

138 parts (1 mol) of 3-methoxy-5-methylphenol, 140 parts of water and 0.7 part of calcium hydroxide were charged in a kolben reactor equipped with a thermometer, stirrer, reflux condenser and dropping funnel, to which 146 parts (1.8 mols) of 37% formalin was dropwise added for 0.5 hour while stirring at 60° C., and the mixture was further stirred at the same temperature for 1.5 hours. 186 parts (1.7 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of 3-methoxy-5-methylphenol.m-aminophenol.formaldehyde.

The resulting resin had a composition comprising 4.0% of the monomers and 57.5% of 5 or more substituted phenols structure components, and a 3-methoxy-5-methylphenol/m-aminophenol co-condensation mol ratio of 1/1.4.

Estimation of the resin was carried out in an analogous manner to Example 71 to obtain results as shown in Table 9.

EXAMPLE 78

167 parts (1 mol) of 3-methoxy-5-isopropylphenol, 170 parts of water and 0.85 part of calcium hydroxide were charged in a kolben reactor equipped with a thermometer, stirrer, reflux condenser and dropping funnel, to which 105 parts (1.3 mols) of 37% formalin was dropwise added for 0.5 hour while stirring at 60° C., and the mixture was further stirred at the same temperature for 3 hours. 186 parts (1.7 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of 3-methoxy-5-isopropylphenol.m-aminophenol.formaldehyde.

The resulting resin had a composition comprising 9.5% of the monomers and 52.5% of 5 or more substituted phenols structure components, and a 3-methoxy-5-isopropylphenol/m-aminophenol co-condensation mol ratio of 1/1.3.

Estimation of the resin was carried out in an analogous manner to Example 71 to obtain results as shown in Table 9.

EXAMPLE 79

122 parts (1 mol) of 3,5-xylenol, 120 parts of water and 0.6 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 1.5 hours. 172 parts (1.4 mols) of N-methyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of 3,5-xylenol. N-methyl-m-aminophenol.formaldehyde.

The resulting resin had a composition comprising 10.0% of the monomers and 42.5% of 5 or more substituted phenols structure components, and a 3,5-xylenol/N-methyl-m-aminophenol co-condensation mol ratio of 1/0.9.

Estimation of the resin was carried out in an analogous manner to Example 71 except using the rubber latex of Example 13 instead of RFL of 1 to obtain results shown in Table 9.

EXAMPLE 80

122 parts (1 mol) of 3,5xylenol, 120 parts of water and 0.6 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 1.5 hours. 246 parts (2 mols) of N-methyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of 3,5-xylenol.N-methyl-m-aminophenol.formaldehyde.

The resulting resin had a composition comprising 10.5% of the monomers and 45.5% of 5 or more substituted phenols structure components, and a 3,5-xylenol/N-methyl-m-aminophenol co-condensation mol ratio of 1/1.7.

Estimation of the resin was carried out in an analogous manner to Example 71 to obtain results as shown in Table 9.

EXAMPLE 81

122 parts (1 mol) of 3,5-xylenol, 120 parts of water and 0.6 parts of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 1 hour. 384 parts (2.8 mols) of N,N-dimethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of 3,5-xylenol. N,N-dimethyl-m-aminophenol.formaldehyde.

The resulting resin had a composition comprising 10.0% of the monomers and 48.0% of 5 or more substituted phenols structure components, and a 3,5-xylenol/N,N-dimethyl-m-aminophenol co-condensation mol ratio of 1/2.0.

Estimation of the resin was carried out in an analogous manner to Example 71 to obtain results as shown in Table 9.

EXAMPLE 82

122 parts (1 mol) of 3,5-xylenol, 120 parts of water and 0.6 parts of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 1.5 hours. 137 parts (1 mol) of N-ethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of 3,5-xylenol.N-ethyl-m-aminophenol.formaldehyde.

The resulting resin had a composition comprising 11.0% of the monomers and 43.0% of 5 or more substituted phenols structure components, and a 3,5-xylenol/N-ethyl-m-aminophenol co-condensation mol ratio of 1/2.0.

Estimation of the resin was carried out in an analogous manner to Example 79 to obtain results as shown in Table 9.

EXAMPLE 83

122 parts (1 mol) of 3,5-xylenol, 120 parts of water and 0.6 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 1.5 hours. 330 parts (2 mols) of N,N-diethyl-m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of 3,5-xylenol.N,N-diethyl-m-aminophenol-formaldehyde.

The resulting resin had a composition comprising 10.5% of the monomers and 46.5% of 5 or more substituted phenols structure components, and a 3,5-xylenol/N,N-diethyl-m-aminophenol co-condensation mol ratio of 1/0.6.

Estimation of the resin was carried out in an analogous manner to Example 71 to obtain results as shown in Table 9.

EXAMPLES 84 to 86

The procedure of Example 71 was repeated except changing the mixing ratio of the aqueous alkaline solution of the co-condensation product and RFL, thus obtaining test results shown in Table 9.

EXAMPLE 87

The procedure of Example 71 was repeated except using the rubber latex of Example 13 instead of RFL of Example 1 to obtain estimation results shown in Table 9.

EXAMPLE 88

182 parts (1 mol) of 3,5-diethoxyphenol, 180 parts of water and 0.9 part of calcium hydroxide were charged in a kolben reactor equipped with a thermometer, stirrer, reflux condenser and dropping funnel, to which 114 parts (1.4 mols) of 37% formalin was dropwise added for 1 hour while stirring at 60° C., and the mixture was further stirred at the same temperature for 1.5 hours. 175 parts (1.6 mols) of m-aminophenol was then added to the mixture, stirred at 120° C. for 1 hour, then heated at 150° C. and a reduced pressure of 40 torr for 1 hour to distil off water and further heated at 200° C. and a reduced pressure of 5 torr for 0.5 hour to reduce the unreacted monomers, thus obtaining a co-condensation resin of 3,5-diethoxyphenol.m-aminophenol.formaldehyde.

The resulting resin had a composition comprising 7.5% of the monomers and 53.5% of 5 or more substituted phenols structure components, and a 3,5-diethoxyphenol/m-aminophenol co-condensation mol ratio of 1/1.25.

Estimation of the resin was carried out in an analogous manner to example 71 to obtain results as shown in Table 9.

EXAMPLE 89

122 parts (1 mol) of 3,5-xylenol, 120 parts of water and 0.6 part of calcium hydroxide were charged in a kolben reactor equipped with a thermometer, stirrer, reflux condenser and dropping funnel, to which 114 parts (1.4 mols) of 37% formalin was dropwise added for 0.5 hour while stirring at 60° C., and the mixture was further stirred at the same temperature for 1.5 hours. 209 parts (1.7 mols) of 3-amino-5-methylphenol was then added to the mixture, stirred at 120° C. for 1 hour, then heated at 150° C. and a reduced pressure of 40 torr for 1 hour to distil off water and further heated at 200° C. and a reduced pressure of 5 torr for 1 hour to reduce the unreacted monomers, thus obtaining a co-condensation resin of 3,5-xylenol.3-amino-5-methylphenol.formaldehyde.

The resulting resin had a composition comprising 8.5% of the monomers and 45.0% of 5 or more substituted phenols structure components, and a 3,5-xylenol/3-amino-5-methylphenol co-condensation mol ratio of 1/1.3.

Estimation of the resin was carried out in an analogous manner to Example 71 to obtain results as shown in Table 9.

TABLE 9

| | Example 71 | Example 72 | Example 73 | Example 74 | Example 75 |
|---|---|---|---|---|---|
| Co-condensate | | | | | |
| Composition | | | | | |
| Monomer 1 | 3,5-xylenol | 3-methyl-5-isopropylphenol | m-ethylphenol | m-tert-butyl-phenol | m-ethoxyphenol |
| Monomer 2 | m-aminophenol | m-aminophenol | m-aminophenol | m-aminophenol | m-aminophenol |
| Molecular Weight | | | | | |
| Monomer Content (%) | 6.5 | 5.5 | 4.5 | 8.0 | 7.5 |
| 5 or more Substituted Phenols | 56.5 | 58.0 | 58.5 | 50.5 | 48.5 |

TABLE 9-continued

| Structure Components Content (%) Mixing Ratio | | | | | |
|---|---|---|---|---|---|
| Co-condensate/RFL | 50/100 | 50/100 | 40/100 | 40/100 | 50/100 |
| Co-condensate/Latex | — | — | — | — | — |
| Initial Bonding Force (kg/cord) | 3.12 | 3.00 | 3.24 | 3.00 | 3.20 |
| Heat Resisting Bonding Force (kg/cord) | 2.74 | 2.54 | 2.80 | 2.48 | 2.86 |
| Monomer 1/Monomer 2 Co-condensation Mol Ratio | 1/1.2 | 1/1.15 | 1/1.4 | 1/1.2 | 1/1.3 |

| | Example 76 | Example 77 | Example 78 | Example 79 | Example 80 |
|---|---|---|---|---|---|
| Co-condensate Composition | | | | | |
| Monomer 1 | m-butoxyphenol | 3-methoxy-5-methylphenol | 3-methoxy-5-isopropylphenol | 3,5-xylenol | 3,5-xylenol |
| Monomer 2 | m-aminophenol | m-aminophenol | m-aminophenol | N-methyl-m-aminophenol | N-methyl-m-aminophenol |
| Molecular Weight | | | | | |
| Monomer Content (%) | 6.0 | 4.0 | 9.5 | 10.0 | 10.5 |
| 5 or more Substituted Phenols Structure Components Content (%) | 49.5 | 57.5 | 52.5 | 42.5 | 45.5 |
| Mixing Ratio | | | | | |
| Co-condensate/RFL | 50/100 | 50/100 | 50/100 | — | 50/100 |
| Co-condensate/Latex | — | — | — | 50/100 | — |
| Initial Bonding Force (kg/cord) | 3.08 | 3.04 | 2.98 | 2.96 | 2.88 |
| Heat Resisting Bonding Force (kg/cord) | 2.56 | 2.66 | 2.54 | 2.48 | 2.50 |
| Monomer 1/Monomer 2 Co-condensate Mol Ratio | 1/1.3 | 1/1.4 | 1/1.3 | 1/0.9 | 1/1.7 |

| | Example 81 | Example 82 | Example 83 | Example 84 | Example 85 |
|---|---|---|---|---|---|
| Co-condensate Composition | | | | | |
| Monomer 1 | 3,5-xylenol | 3,5-xylenol | 3,5-xylenol | 3,5-xylenol | 3,5-xylenol |
| Monomer 2 | N,N-dimethyl-m-aminophenol | N-ethyl-m-aminophenol | N,N-diethyl-m-aminophenol | m-aminophenol | m-aminophenol |
| Molecular Weight | | | | | |
| Monomer Content (%) | 10.0 | 11.0 | 10.5 | 6.5 | 6.5 |
| 5 or more Substituted Phenols Structure Components Content (%) | 48.0 | 43.0 | 46.5 | 56.5 | 56.5 |
| Mixing Ratio | | | | | |
| Co-condensate/RFL | — | — | 50/100 | 10/100 | 100/100 |
| Co-condensate/Latex | 50/100 | 50/100 | — | — | — |
| Initial Bonding Force (kg/cord) | 2.96 | 2.90 | 2.92 | 3.00 | 2.92 |
| Heat Resisting Bonding Force (kg/cord) | 2.58 | 2.44 | 2.48 | 2.54 | 2.48 |
| Monomer 1/Monomer 2 Co-condensation Mol Ratio | 1/2.0 | 1/0.7 | 1/0.6 | 1/1.2 | 1/1.2 |

| | Example 86 | Example 87 | Example 88 | Example 89 |
|---|---|---|---|---|
| Co-condensate Composition | | | | |
| Monomer 1 | 3,5-xylenol | 3,5-xylenol | 3,5-diethoxyphenol | 3,5-xylenol |
| Monomer 2 | m-aminophenol | m-aminophenol | m-aminophenol | 3-amino-5-methyl phenol |
| Molecular Weight | | | | |
| Monomer Content (%) | 6.5 | 6.5 | 7.5 | 8.5 |
| 5 or more Substituted Phenols Structure Components Content (%) | 56.5 | 56.5 | 53.5 | 45.0 |
| Mixing Ratio | | | | |
| Co-condensate/RFL | 125/100 | — | 50/100 | 50/100 |
| Co-condensate/Latex | — | 50/100 | — | — |
| Initial Bonding Force (kg/cord) | 2.86 | 3.08 | 2.94 | 2.96 |

| TABLE 9-continued | | | | |
|---|---|---|---|---|
| Heat Resisting Bonding Force (kg/cord) | 2.39 | 2.66 | 2.48 | 2.52 |
| Monomer 1/Monomer 2 Co-condensation Mol Ratio | 1/1.2 | 1/1.2 | 1/1.25 | 1/1.3 |

What is claimed is:

1. An adhesive composition for a fibrous material which comprises:
  (A) a rubber latex or RFL, and
  (B) a co-condensation resin obtained by co-condensing:
    (i) m-cresol
    (ii) at least one member selected from compounds represented by the following general formula (II),

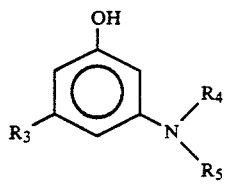

wherein $R_3$, $R_4$ and $R_5$ are hydrogen atoms or alkyl groups, the sum of carbon atoms of $R_3$, $R_4$ and $R_5$ being 0 to 4; and
    (iii) an aldehyde,
wherein the co-condensation resin has a molecular weight of 400 to 1000, wherein the co-condensation mol ratio of m-cresol to the compounds represented by general formula (II) is 1:0.5 to 1:2, and wherein the co-condensation resin comprises 15% or less of m-cresol and the compounds represented by general formula (II) and 35 to 65% of condensation products having 5 or more repeating units.

2. The adhesive composition for a fibrous material as claimed in claim 1, wherein the co-condensation resin comprises no condensation products having 2 or less repeating units and at most 65% of condensation products having 5 or more repeating units.

3. The adhesive composition for a fibrous material as claimed in claim 1, wherein the compounds represented by general formula (II) are selected from the group consisting of m-aminophenol, N-methyl-m-aminophenol, N,N-dimethyl-m-aminophenol, N-ethyl-m-aminophenol, 3-amino-5-methylphenol and 3-N-methyl-amino-5-methylphenol.

4. The adhesive composition for a fibrous material as claimed in claim 1, wherein the compound represented by general formula (II) is m-aminophenol and the aldehyde is formaldehyde.

5. The adhesive composition for a fibrous material as claimed in claim 1, wherein the co-condensing is carried out by a first stage reaction comprising reacting m-cresol with the aldehyde in the presence of an alkaline catalyst and a second stage reaction comprising reacting the resulting reaction mixture of the first stage reaction with the compounds represented by general formula (II).

6. The adhesive composition for a fibrous material as claimed in claim 1, wherein said rubber latex contains a methylene donor or a methylene donor-containing resin therein.

7. The adhesive composition for a fibrous-material as claimed in claim 6, wherein the methylene donor is selected from the group consisting of formalin, paraformaldehyde and hexamethylenetetramine.

8. The adhesive composition for a fibrous material as claimed in claim 6, wherein the methylene donor-containing resin is a resorcinolformaldehyde resin.

9. The adhesive composition for a fibrous material as claimed in claim 6, wherein the rubber latex is selected from the group consisting of natural rubber latex, VP latex, SBR latex, butyl latex, NBR latex, CR latex and compound rubbers dispersed in water or organic solvents.

* * * * *